United States Patent [19]

Hashimoto

[11] Patent Number: 4,925,280
[45] Date of Patent: May 15, 1990

[54] VARI-FOCAL LENS SYSTEM

[75] Inventor: Takeshi Hashimoto, Tokyo, Japan

[73] Assignee: Olympus Optical Co., Ltd., Tokyo, Japan

[21] Appl. No.: 308,311

[22] Filed: Feb. 7, 1989

[30] Foreign Application Priority Data

Feb. 8, 1988 [JP] Japan .................. 63-025615

[51] Int. Cl.⁵ .................. G02B 15/14; G02B 9/64
[52] U.S. Cl. .................. 350/423; 350/426; 350/427
[58] Field of Search .................. 350/426, 423, 427

[56] References Cited

U.S. PATENT DOCUMENTS 3,160,699 12/1964 Yamaji .
3,972,592 8/1976 Ruben .
4,447,135 5/1984 Nakamura .................. 350/426
4,802,747 2/1989 Horiuchi .................. 350/427

FOREIGN PATENT DOCUMENTS 58-153913 9/1983 Japan .
61-110112 5/1986 Japan .
62-24213 2/1987 Japan .

Primary Examiner—Bruce Y. Arnold
Assistant Examiner—Rebecca D. Gass
Attorney, Agent, or Firm—Cushman, Darby & Cushman

[57] ABSTRACT

A compact, light-weight vari-focal lens system manufacturable at low cost comprising a negative front lens group and a positive rear lens group, said front lens group consisting of a first positive lens unit and a second lens unit having a vari-focal function, said rear lens group having an imaging function and used for correcting deviation of the image point caused due to variation of focal length, said second lens unit consisting of a negative lens component and a positive lens component, and said vari-focal lens system comprising at least one aspherical surface.

20 Claims, 17 Drawing Sheets

VARI-FOCAL LENS SYSTEM

BACKGROUND OF THE INVENTION (a) Field of the Invention

The present relates to a vari-focal lens system for cameras, and more specifically to a vari-focal lens system for video cameras.

(b) Description of the Prior Art

In the recent years where compact, light-weight video cameras are offered at low prices, demand for domestic video cameras is increasing rapidly. In order to further develop this demand, it is necessary to design compactor video cameras having lower weight and manufacturable at lower cost, thereby posing problems to obtain more compact lens systems having lower weight and manufacturable at lower cost.

Currently, lens systems for domestic video cameras are designed mainly as zoom lens systems having a zoom ratio of 6 and an F number of F/1.2 to F/1.6. This is because these specifications are very advantageous for lens design and adequate for meeting practical needs. As such conventional zoom lens systems for video cameras, there are known the lens systems disclosed by Japanese Unexamined Published Patent Applications No. 153913/58 and No. 24213/62.

The zoom lens system disclosed by the former patent consists of four lens units, out of which the second lens unit consists of three lens components, whereas the third and fourth lens units consist of eight lens components in total.

The zoom lens system disclosed by the latter patent consists of four lens units, out of which the second lens unit having a vari-focal function consists of three lens components, whereas the third lens unit having a function to correct deviation of image point caused due to variation of focal length and the fourth lens unit having an imaging functions consist of four to seven lens components in total.

Either of these conventional zoom lens systems has a defect that it comprises a large number of lens components, concretely 10 to 14 lens components, requires high manufacturing cost accordingly, and is large and heavy in weight.

Further, in the zoom lens system disclosed by Japanese Unexamined Published Patent Application No. 110112/61, the second lens unit is composed of two lens components by using multiple a spherical surfaces, and the third lens unit having a function to correct deviation of image point caused due to variation of focal length and a fourth lens unit having an imaging function are composed of four lens components in total. Owing to this design, the lens system as a whole consists of a small number of lens components, concretely eight lens components. However, this zoom lens system requires high manufacturing cost since it adopts multiple cemented surfaces having high curvature. Moreover, the cemented doublet arranged in the second lens unit has very high curvature on the surface thereof and allows lateral chromatic aberration to be abruptly aggravated at the marginal portion of image, thereby lowering contrast and producing remarkable color separation at the marginal portion of image.

U.S. Pat. No. 3972592 discloses a zoom lens system consisting of three lens units, out of which the second lens unit consists of a single biconcave lens component and the third lens unit is kept fixed during variation of focal length. Accordingly, this zoom lens system is different from the vari-focal lens system according to the present invention in which a third lens unit is shifted wholly or partially for correcting deviation of image point during variation of focal length as described later.

Furthermore, the zoom lens system disclosed by U.S. Pat. No.. 3160699 does not use an a spherical surface nor corrects aberrations sufficiently. In addition, the lens unit $III_2$ comprises a large number of lens components and has a complicated composition.

SUMMARY OF THE INVENTION

A primary object of the present invention is to provide a compact, light-weight vari-focal lens system for video cameras designed for a vari-focal ratio of 4 to 6 and an F number on the order of F/1.5 to F/2.8, and consisting of a small number of lens components.

The vari-focal lens system according to the present invention consists of a front lens group which has negative refractive power and a rear lens group which has positive refractive power, and is characterized in that said rear lens group has an imaging function in addition to a function to correct deviation of image point caused due to variation of focal length and a spherical surfaces are used in said vari-focal lens system. Speaking more concretely, the front lens group consists of a first lens unit having positive refractive power, and a second lens unit having negative refractive power and a vari-focal function, whereas the rear lens group has an imaging function and is so adapted as to correct deviation of the image point caused due to variation of focal length by shifting the rear lens group as a whole or certain lens components arranged in the rear lens group. Further, the vari-focal lens system according to the present invention is so designed as to comprise a very small number of lens components, concretely six to eight lens components, by selecting a novel lens configuration for the second lens unit, and by using a spherical surfaces in the second lens unit and the rear lens group.

Conventionally, most of the zoom lens systems having relatively high vari-focal ratios comprise, in the order from the object side, a first lens unit consisting of three lens components, a second lens unit consisting of a negative lens component, a negative lens component and a positive lens component, and shifted for variation of focal length, a third lens unit consisting of one or two lens components and having a function to correct deviation of image point caused due to variation of focal length, and a fourth lens unit consisting of six to eight lens components and having an imaging function.

The present invention has succeeded in reducing the number of lens components by adopting novel lens configuration in place of those of the second lens unit, the third lens unit and the fourth lens unit of the conventional zoom lens systems.

The vari-focal lens system according to the present invention uses a negative lens component and a positive lens component arranged in the order from the object side in place of the conventional second lens unit consisting of a negative lens component, a negative lens component and a positive lens component. Accordingly, the negative refractive power shared conventionally by the two negative lens components must be imparted to a single negative lens component in the vari-focal lens system according to the present invention. For this reason, the present invention adopts a biconcave lens component having strong refractive power in the second lens unit. Since this biconcave lens component has strong refractive power, it produces remarkable distortion at the wide position and remarkable lateral chromatic aberration at the short wavelengths.

This distortion is corrected favorably, while reserving the refractive power required for obtaining a high vari-focal ratio, by adopting, as at least one of the diverging surfaces of the two lens components arranged in the second lens unit, an a spherical surface having a substantially spherical central portion and marginal portions whose curvature is lowered.

It is desirable to design the above-mentioned a spherical surface so as to satisfy the following condition (1):

$$5 \times 10^{-3} < \left| \frac{\Delta x \cdot r}{k \cdot f_w} \right| < 5 \times 10^{-1} \quad (1)$$

wherein the reference symbol r represents radius of curvature on the either of the a spherical surfaces whichever has the higher effect to correct the distortion, the reference symbol k designates distance as measured from the optical axis to the intersection between the principal ray passing through the highest image portion and said a spherical surface, the reference symbol $\Delta x$ denotes deviation of said intersection on said a spherical surface from the basic spherical surface, and the reference symbol $f_w$ represents focal length of the vari-focal lens system as a whole at the wide position.

If $5 \times 10^{-3}$ defined as the lower limit of the condition (1) is exceeded, the deviation of the a spherical surface from the basic spherical surface thereof will be insufficient for correcting the distortion. If $5 \times 10^{-1}$ defined as the upper limit of the condition (1) is exceeded, the deviation of the a spherical surface from the basic spherical surface thereof will be large, thereby producing an effect preferable for correcting the distortion, but aggravating aberrations such as astigmatism.

In order to eliminate the lateral chromatic aberration which is increased by reducing the number of the lens components in the second lens unit, it is preferable to design the second lens unit so as to satisfy the following condition (2):

$$D_{12} = \frac{\nu_{II1} \cdot f_{II1} + \nu_{II2} \cdot f_{II2}}{\nu_{II2} + \nu_{II1}} \quad (2)$$

wherein the reference symbols $f_{II1}$ and $f_{II2}$ represent focal lengths of the negative lens component and the positive lens component respectively arranged in the second lens unit, the reference symbols $\nu_{II1}$ and $\nu_{II2}$ designate Abbe's numbers of said negative lens component and said positive lens component respectively, and the reference symbol $D_{12}$ denotes distance as measured from the rear principal point of said negative lens component to the front principal point of said positive lens component.

When said negative lens component and said positive lens component are cemented to each other, it is possible to correct the lateral chromatic aberration of high orders by designing the second lens unit so as to satisfy the condition (2). When said negative lens component has refractive power extremely higher than that of said positive lens component as in the case of the vari-focal lens system according to the present invention, however, it is necessary for cementing these lens component to each other to match curvature of the positive lens component with the high curvature of the negative lens component. If such a design is adopted, the positive lens component will have strong refractive power, thereby prolonging total focal length of the second lens unit and lowering vari-focal ratio. In order to enhance this vari-focal ratio, the negative lens component must have stronger refractive power and higher curvature which will aggravate aberrations such as the lateral chromatic aberration of high orders.

The vari-focal lens system according to the present invention does not adopt the second lens unit in which the negative lens component and the positive lens component are cemented to each other, but is so designed as to satisfy the following condition (3):

$$|(D'_{12} - D_{12})/D_{12}| < 0.8 \quad (3)$$

wherein the reference symbol $D'_{12}$ represents distance as measured from the rear principal point of said negative lens component to the front principal point of said positive lens component and the reference symbol $D_{12}$ designates the theoretical value determined by the above-mentioned formula (2).

If the above-mentioned condition (3) is not satisfied, it will be difficult to limit the lateral chromatic aberration within a desirable range.

Even when the two lens components are not cemented to each other in the second lens unit as is the case of the vari-focal lens system according to the present invention, it is obliged, if the positive lens component has too strong refractive power, to impart strong refractive power also to the negative lens component, thereby aggravating aberrations such as the lateral chromatic aberration. In order to prevent these aberrations from being aggravated, it is desirable to limit the positive refractive power of the above-mentioned positive lens component within the range defined by the following condition (4):

$$0.15 < |f_{II2}/f_{II} \cdot \beta| < 3 \quad (4)$$

wherein the reference symbol $f_{II2}$ represents focal length of the positive lens component arranged in the second lens unit, the reference symbol $f_{II}$ designates focal length of the second lens unit and the reference symbol $\beta$ denotes vari-focal ratio.

If 0.15 defined as the lower limit of the condition (4) is exceeded, the negative lens component must have strong refractive power for reserving a high vari-focal ratio and the negative lens component having high curvature will make it difficult to correct aberrations such as the lateral chromatic aberration. If 3 defined as the upper limit of the condition (4) is exceeded, a wide airspace must be reserved between the negative lens component and the positive lens component, thereby prolonging total length of the vari-focal lens system.

As is understood from the foregoing description, the present invention has succeeded in composing the second lens unit, which conventionally consists of at least three lens components, of two lens components, i.e., the negative lens component and the positive lens component by selecting the above-described lens arrangement and using the a spherical surfaces. Further, in the vari-focal lens system according to the present invention, the third lens unit and the fourth lens unit which are used as the compensator and the relay lens system in the conventional zoom lens systems are integrated so as to compose a rear lens group. This design makes it possible to further reduce the number of the lens components.

The number of the lens components constituting the rear lens group can be reduced as described above. In order to correct chromatic aberration, however, the rear lens group must comprise at least a negative lens component and a positive lens component. In addition, the reduction of the number of the lens components increases the aberration correcting burden on each lens component, thereby aggravating aberrations, especially spherical aberration and coma.

In order to correct the spherical aberration, it is effective to use an aspherical surface on a lens component arranged in the vicinity of the stop. In the vari-focal lens system according to the present invention, however, an aspherical surface is used as the extremely image side surface in the rear lens group for correcting coma at the same time. This aspherical surface is so designed as to satisfy the following condition (5):

$$1 \times 10^{-3} < \left| \frac{\Delta x \cdot f_{BB}}{h \cdot f_w} \right| < 5 \times 10^{-1} \quad (5)$$

wherein the reference symbol h represents distance from the optical axis to the intersection between the paraxial marginal ray and the extremely image side surface in the rear lens group (said aspherical surface), the reference symbol $\Delta x$ designates deviation of said intersection on the aspherical surface from the basic spherical surface thereof, the reference symbol fBB denotes focal length of the extremely image side lens component arranged in the rear lens group, and the reference symbol $f_w$ represents focal length of the vari-focal lens system as a whole at the wide position.

$1 \times 10^{-3}$ defined as the lower limit of the condition (5) is exceeded, an attempt to impart sufficient refractive power to the extremely image side lens component arranged in the rear lens group for balancing power distribution in the rear lens group will make it impossible to reserve a sufficient deviation of the aspherical surface from the basic spherical surface, thereby making it difficult to correct the spherical aberration, coma and so on. If $5 \times 10^{-1}$ defined as the upper limit of the condition (5) is exceeded, the refractive power of the extremely image side lens component reserved for balancing power distribution in the rear lens group will enlarge the deviation of the aspherical surface from the basic spherical surface, thereby producing an effect advantageous for correcting the spherical aberration and coma, but aggravating the other aberrations too remarkably for correction.

As is understood from the foregoing description, the present invention has succeeded in composing the rear lens group of two or three lens components in total including at least one negative lens component and a positive lens component by integrating the compensator and the relay lens system which consist of four to six lens components in the conventional zoom lens systems and by adequately using the aspherical surface.

In addition, the function of the compensator which is obtained with the rear lens group as a whole is available only with certain lens component(s) arranged in the rear lens group.

Since the second lens unit is composed only of the two lens components as described above in the varifocal lens system according to the present invention, the second lens unit is shifted for a long distance for variation of focal length and, the position of the entrance pupil is shifted toward the image side, thereby enlarging diameter of the foremost lens and making it impossible to reduce weight of the vari-focal lens system.

It is known that the position of the entrance pupil is shifted toward the object side and diameter of the front lens component is minimized by shifting principal point of a positive lens component located before a stop toward the image side or shifting the principal point of a negative lens component arranged before a stop toward the object side in general lens systems. In case of a lens system comprising a small number of lens components like the vari-focal lens system according to the present invention, however, it will be difficult to adjust position of the principal point if too much emphasis is laid on correction of aberrations.

The present invention has succeeded in designing a vari-focal lens system comprising a small number of lens components and having a small diameter of the front lens component by performing adjustment of position of principal point and correction of aberration with good balance. Actually, the vari-focal lens system according to the present invention is so designed as to satisfy the following conditions (6) and (7) for shifting the principal point of the first lens unit toward the image side and principal point of the second lens unit toward the object side:

$$-1.5 < HB_I/f_s < -3 \times 10^{-2} \quad (6)$$

$$-3.5 < HB_{II}/f_s < -7 \times 10^{-2} \quad (7)$$

wherein the reference symbol $HB_I$ represents distance as measured from the vertex on the image side surface of the extremely image side lens component arranged in the first lens unit to the rear principal point of the first lens unit taking the direction toward the image side as positive, the reference symbol $HB_{II}$ designates distance as measured from the vertex on the image side surface of the negative lens component arranged in the second lens unit to the rear principal point of the second lens unit taking the direction toward the image side as positive, and the reference symbol $f_s$ denotes an intermediate focal length ($f_s$ is defined as $\sqrt{f_W \cdot f_T}$ when focal lengths at the wide position and the tele position are represented by $f_W$ and $f_T$ respectively).

If $-1.5$ defined as the lower limit of the condition (6) is exceeded or $-7 \times 10^{-2}$ defined as the upper limit of the condition (7) is exceeded, it will be impossible to shift the entrance pupil sufficiently frontward and minimize diameter of the foremost lens. If $-3 \times 10^{-2}$ defined as the upper limit of the condition (6) or $-3.5$ defined as the lower limit of the condition (7) is exceeded, an effect advantageous for shifting the entrance pupil frontward will be produced but aberrations will be aggravated due to unbalanced correction of aberrations.

Furthermore, in order to allow the vari-focal lens system according to the present invention to reserve a long back focal length permitting to interpose optical path splitting members for a viewfinder, optical filter, etc. between the final lens surface and an image sensor, the front lens group and the rear lens group of the vari-focal lens system are so designed as to have refractive power satisfying the following condition (8):

$$0.4 < |f_F/f_R| < 5 \quad (8)$$

wherein the reference symbols $f_F$ and $f_R$ represent focal lengths of the front lens group and the rear lens group respectively at the wide position.

If 5 defined as the upper limit of the condition (8) is exceeded, the rear lens group will have refractive power too strong as compared with that of the front lens group, thereby making it impossible to obtain a sufficient back focal length and aggravating aberrations such as spherical aberration too remarkably for correction. If 0.8 defined as the lower limit of the condition (8) is exceeded, the front lens group will have refractive power too strong as compared with that of the rear lens group, thereby producing an effect advantageous for prolonging back focal length but aggravating distortion, etc. too remarkably for correction.

The vari-focal lens system according to the present invention is designed as to perform focusing by shifting frontward the lens system as a whole or only the first lens unit, and can be focused also by shifting the rear lens group wholly or partially.

When the vari-focal lens system is focused by shifting frontward the first lens unit, the shift distance for focusing is generally kept unchanged by varying focal length. However, this focusing mode has defects that a heavy lens unit must be shifted for focusing and that rays are apt to be eclipsed by shifting the lens unit. When the rear lens group is shifted for focusing, the focusing mode has a characteristic that focusing can be performed with a light load since the lens group shifted for focusing is light. Therefore, the latter focusing mode is very effective to accelerate focusing speed for automatically focusing cameras. Moreover, the rear lens group has not only the focusing function but also the function of the compensator. When the rear lens group is so designed as to be independently shifted to the focusing position on the basis of the focusing information, it is therefore sufficient to shift only the second lens unit for variation of focal length. Accordingly, it is unnecessary to use a complicated zooming cam, thereby enabling to remarkably reduce manufacturing cost of the lens barrel. In addition, the rear lens group is shifted for only a short distance at the wide position and the vari-focal lens system can be focused on an object located at a very shoft distance by shifting the rear lens group for a short distance with little variation of aberrations.

DETAILED DESCRIPTION OF THE PREFERRED EMBODIMENTS

Figure 1:
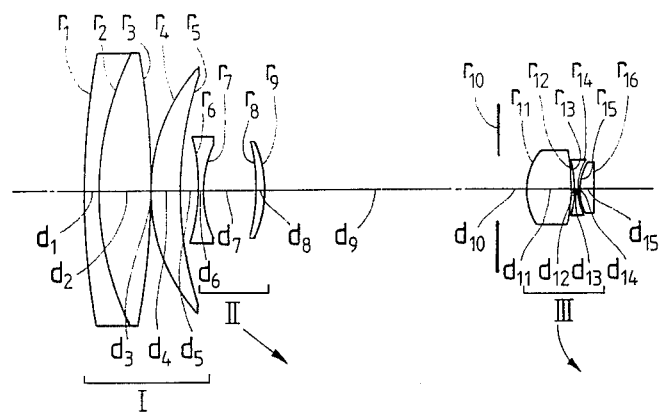
FIG. 1 through FIG. 9 show sectional views illustrating Embodiments 1 through 9 of the vari-focal lens system according to the present invention.

Now, the vari-focal lens system according to the present invention will be detailedly described in the form of numerical data with reference to the accompanying drawings:

Embodiment 1 f = 9–54, F/2.8

$r_1 = 121.1072$
  $d_1 = 2.0000$  $n_1 = 1.80518$  $\nu_1 = 25.43$
$r_2 = 44.1086$
  $d_2 = 8.4998$  $n_2 = 1.56965$  $\nu_2 = 49.33$
$r_3 = -122.6307$
  $d_3 = 0.1419$
$r_4 = 31.8845$
  $d_4 = 3.9995$  $n_3 = 1.69350$  $\nu_3 = 53.23$
$r_5 = 56.2973$
  $d_5 = D_1$ (variable)
$r_6 = -26.7372$
  $d_6 = 0.6877$  $n_4 = 1.88300$  $\nu_4 = 40.78$
$r_7 = 15.6181$ (aspherical surface)
  $d_7 = 8.0922$
$r_8 = -31.0794$
  $d_8 = 1.4993$  $n_5 = 1.84666$  $\nu_5 = 23.78$
$r_9 = -19.4162$
  $d_9 = D_2$ (variable)
$r_{10} = \infty$ (stop)
  $d_{10} = D_3$ (variable)
$r_{11} = 8.7754$
  $d_{11} = 7.1794$  $n_6 = 1.74950$  $\nu_6 = 35.27$
$r_{12} = -51.2152$
  $d_{12} = 0.4472$
$r_{13} = -22.9857$
  $d_{13} = 0.5000$  $n_7 = 1.84666$  $\nu_7 = 23.78$
$r_{14} = 7.0609$
  $d_{14} = 0.3918$
$r_{15} = 7.4864$
  $d_{15} = 2.1077$  $n_8 = 1.60311$  $\nu_8 = 60.70$
$r_{16} = -91.9629$ (aspherical surface)
  $d_{16} = D_4$ (variable)

| f | 9 | 22 | 54 |
|---|---|---|---|
| $D_1$ | 3.000 | 21.518 | 38.322 |
| $D_2$ | 36.286 | 17.767 | 0.963 |
| $D_3$ | 4.117 | 2.224 | 6.134 |
| $D_4$ | 3.653 | 5.547 | 1.637 | aspherical coefficient
7th surface  $E = -0.94400 \times 10^{-4}$, $F = 0.34884 \times 10^{-6}$
  $G = -0.60372 \times 10^{-8}$
16th surface  $E = 0.48452 \times 10^{-3}$, $F = 0.94968 \times 10^{-5}$
  $G = 0.10157 \times 10^{-6}$
$|\Delta x \cdot r/k \cdot f_w| = 4.2 \times 10^{-2}$, $|(D'_{12} - D_{12})/D_{12}| = 0.28$
$|f_{III}/f_{II} \cdot \beta| = 0.55$, $|\Delta x \cdot f_{BB}/h \cdot f_w| = 1.8 \times 10^{-2}$.
$HB_I/f_s = -0.22$, $HB_{II}/f_s = -0.68$, $|f_F/f_R| = 1.57$ Embodiment 2 f = 8–48, F/2

$r_1 = 110.1796$
  $d_1 = 2.0000$  $n_1 = 1.80518$  $\nu_1 = 25.43$
$r_2 = 38.6937$
  $d_2 = 8.4799$  $n_2 = 1.60738$  $\nu_2 = 56.81$
$r_3 = -324.5380$
  $d_3 = 0.1348$
$r_4 = 33.6224$
  $d_4 = 4.4969$  $n_3 = 1.70154$  $\nu_3 = 41.24$
$r_5 = 83.9146$
  $d_5 = D_1$ (variable)
$r_6 = -29.7705$
  $d_6 = 0.9993$  $n_4 = 1.60311$  $\nu_4 = 60.70$
$r_7 = 9.2021$ (aspherical surface)
  $d_7 = 10.7439$ 4,925,280

-continued

Embodiment 2

| | | | |
|---|---|---|---|
| $r_8 = -36.9407$ | | | |
| | $d_8 = 1.5214$ | $n_5 = 1.84666$ | $\nu_5 = 23.78$ |
| $r_9 = -27.3789$ | | | |
| | $d_9 = D_2$ (variable) | | |
| $r_{10} = \infty$ (stop) | | | |
| | $d_{10} = D_3$ (variable) | | |
| $r_{11} = 23.8062$ | | | |
| | $d_{11} = 2.4523$ | $n_6 = 1.74950$ | $\nu_6 = 35.27$ |
| $r_{12} = -237.6984$ | | | |
| | $d_{12} = 8.6644$ | | |
| $r_{13} = -12.2633$ (aspherical surface) | | | |
| | $d_{13} = 0.7081$ | $n_7 = 1.84666$ | $\nu_7 = 23.78$ |
| $r_{14} = -153.3824$ | | | |
| | $d_{14} = 0.5697$ | | |
| $r_{15} = 20.6467$ | | | |
| | $d_{15} = 3.7184$ | $n_8 = 1.6031$ | $\nu_8 = 60.70$ |
| $r_{16} = -10.8320$ (aspherical surface) | | | |
| | $d_{16} = D_4$ (variable) | | |

| f | 8 | 19.6 | 48 |
|---|---|---|---|
| $D_1$ | 2.919 | 20.311 | 33.684 |
| $D_2$ | 31.225 | 13.833 | 0.461 |
| $D_3$ | 3.380 | 1.028 | 2.486 |
| $D_4$ | 8.209 | 10.561 | 9.103 | aspherical coefficient
7th surface  $E = -0.25500 \times 10^{-3}$, $F = 0.89987 \times 10^{-6}$
 $G = -0.38912 \times 10^{-7}$
13th surface  $E = 0.50050 \times 10^{-5}$, $F = 0.10923 \times 10^{-5}$
 $G = 0.11184 \times 10^{-7}$
16th surface  $E = 0.20324 \times 10^{-3}$, $F = 0.10271 \times 10^{-5}$
 $G = 0.31161 \times 10^{-8}$
$|\Delta x \cdot r/k \cdot f_w| = 1.1 \times 10^{-1}$, $|(D'_{12} - D_{12})/D_{12}| = 0.43$
$|f_{ID}/f_{II} \cdot \beta| = 1.31$, $|\Delta x \cdot f_{BB}/h \cdot f_w| = 6.3 \times 10^{-2}$
$HB_I/f_s = -0.26$, $HB_{II}/f_s = -0.79$, $|f_F/f_R| = 1.10$

Embodiment 3
f = 9-54, F/1.5

| | | | |
|---|---|---|---|
| $r_1 = 54.5471$ | | | |
| | $d_1 = 2.0000$ | $n_1 = 1.80518$ | $\nu_1 = 25.43$ |
| $r_2 = 29.0894$ | | | |
| | $d_2 = 8.4995$ | $n_2 = 1.60311$ | $\nu_2 = 60.70$ |
| $r_3 = 96.5913$ | | | |
| | $d_3 = 0.1348$ | | |
| $r_4 = 37.8890$ | | | |
| | $d_4 = 4.8000$ | $n_3 = 1.70154$ | $\nu_3 = 41.24$ |
| $r_5 = 188.7687$ | | | |
| | $d_5 = D_1$ (variable) | | |
| $r_6 = -28.1499$ | | | |
| | $d_6 = 0.7000$ | $n_4 = 1.88300$ | $\nu_4 = 40.78$ |
| $r_7 = 11.3471$ (aspherical surface) | | | |
| | $d_7 = 4.9883$ | | |
| $r_8 = -42.3154$ (aspherical surface) | | | |
| | $d_8 = 2.0000$ | $n_5 = 1.84666$ | $\nu_5 = 23.78$ |
| $r_9 = -19.6032$ | | | |
| | $d_9 = D_2$ (variable) | | |
| $r_{10} = \infty$ (stop) | | | |
| | $d_{10} = D_3$ (variable) | | |
| $r_{11} = 22.4986$ | | | |
| | $d_{11} = 4.2000$ | $n_6 = 1.74950$ | $\nu_6 = 35.27$ |
| $r_{12} = -62.8512$ | | | |
| | $d_{12} = 5.3368$ | | |
| $r_{13} = -16.2141$ | | | |
| | $d_{13} = 0.7000$ | $n_7 = 1.84666$ | $\nu_7 = 23.78$ |
| $r_{14} = 45.5717$ (aspherical surface) | | | |
| | $d_{14} = 0.5731$ | | |
| $r_{15} = 18.4373$ | | | |
| | $d_{15} = 6.5000$ | $n_8 = 1.60311$ | $\nu_8 = 60.70$ |
| $r_{16} = -13.0827$ (aspherical surface) | | | |
| | $d_{16} = D_4$ (variable) | | |

| f | 9 | 22 | 54 |
|---|---|---|---|
| $D_1$ | 3.000 | 19.853 | 33.785 |
| $D_2$ | 32.981 | 16.128 | 2.196 |
| $D_3$ | 4.685 | 1.431 | 2.331 |
| $D_4$ | 9.022 | 12.276 | 11.376 | aspherical coefficient

Embodiment 3 -continued

7th surface  $E = -0.14430 \times 10^{-3}$, $F = 0.13165 \times 10^{-5}$
 $G = -0.15799 \times 10^{-7}$
8th surface  $E = 0.26998 \times 10^{-4}$, $F = 0.54700 \times 10^{-6}$
 $G = -0.34881 \times 10^{-9}$
14th surface  $E = 0$, $F = 0$, $G = -0.46725 \times 10^{-8}$
 $H = -0.58777 \times 10^{-10}$, $I = 0.41227 \times 10^{-12}$
16th surface  $E = 0.13770 \times 10^{-3}$, $F = 0.10000 \times 10^{-6}$
 $G = 0.58833 \times 10^{-8}$
$|\Delta x \cdot r/k \cdot f_w| = 2.7 \times 10^{-2}$, $|(D'_{12} - D_{12})/D_{12}| = 0.26$
$|f_{ID}/f_{II} \cdot \beta| = 0.47$, $|\Delta x \cdot f_{BB}/h \cdot f_w| = 1.4 \times 10^{-1}$
$HB_I/f_s = -0.32$, $HB_{II}/f_s = -0.48$, $|f_F/f_R| = 1.09$

Embodiment 4
f = 9-54, F/2.8

| | | | |
|---|---|---|---|
| $r_1 = 122.4981$ | | | |
| | $d_1 = 2.0000$ | $n_1 = 1.80518$ | $\nu_1 = 25.43$ |
| $r_2 = 37.8965$ | | | |
| | $d_2 = 8.4999$ | $n_2 = 1.60311$ | $\nu_2 = 60.70$ |
| $r_3 = -432.5984$ | | | |
| | $d_3 = 0.1348$ | | |
| $r_4 = 39.5629$ | | | |
| | $d_4 = 4.5000$ | $n_3 = 1.70154$ | $\nu_3 = 41.24$ |
| $r_5 = 302.2655$ | | | |
| | $d_5 = D_1$ (variable) | | |
| $r_6 = -13.7728$ (aspherical surface) | | | |
| | $d_6 = 0.8000$ | $n_4 = 1.88300$ | $\nu_4 = 40.78$ |
| $r_7 = 17.8044$ | | | |
| | $d_7 = 5.7323$ | | |
| $r_8 = -36.1496$ | | | |
| | $d_8 = 1.5000$ | $n_5 = 1.84666$ | $\nu_5 = 23.78$ |
| $r_9 = -16.5595$ | | | |
| | $d_9 = D_2$ (variable) | | |
| $r_{10} = \infty$ (stop) | | | |
| | $d_{10} = 3.4966$ | | |
| $r_{11} = 23.0039$ | | | |
| | $d_{11} = 3.4810$ | $n_6 = 1.74950$ | $\nu_6 = 35.27$ |
| $r_{12} = 66.9264$ | | | |
| | $d_{12} = D_3$ (variable) | | |
| $r_{13} = -11.7574$ | | | |
| | $d_{13} = 0.7000$ | $n_7 = 1.84666$ | $\nu_7 = 23.78$ |
| $r_{14} = -41.4349$ | | | |
| | $d_{14} = 0.5702$ | | |
| $r_{15} = 25.0665$ | | | |
| | $d_{15} = 3.3000$ | $n_8 = 1.60311$ | $\nu_8 = 60.70$ |
| $r_{16} = -10.6673$ (aspherical surface) | | | |
| | $d_{16} = D_4$ (variable) | | |

| f | 9 | 22 | 54 |
|---|---|---|---|
| $D_1$ | 3.000 | 21.459 | 33.970 |
| $D_2$ | 31.742 | 13.283 | 0.772 |
| $D_3$ | 11.535 | 9.814 | 13.114 |
| $D_4$ | 12.012 | 13.733 | 10.433 | aspherical coefficient
6th surface  $E = 0.19285 \times 10^{-3}$, $F = -0.35748 \times 10^{-6}$
 $G = -0.51052 \times 10^{-9}$
16th surface  $E = 0.17821 \times 10^{-3}$, $F = 0.53164 \times 10^{-6}$
 $G = 0.41018 \times 10^{-8}$
$|\Delta x \cdot r/k \cdot f_w| = 5.6 \times 10^{-2}$, $|(D'_{12} - D_{12})/D_{12}| = 0.02$
$|f_{ID}/f_{II} \cdot \beta| = 0.36$, $|\Delta x \cdot f_{BB}/h \cdot f_w| = 2.6 \times 10^{-2}$
$HB_I/f_s = -0.17$, $HB_{II}/f_s = -0.60$, $|f_F/f_R| = 1.07$

Embodiment 5
f = 9-54, F/2.8

| | | | |
|---|---|---|---|
| $r_1 = 98.5525$ | | | |
| | $d_1 = 2.0000$ | $n_1 = 1.80518$ | $\nu_1 = 25.43$ |
| $r_2 = 28.7173$ | | | |
| | $d_2 = 8.4996$ | $n_2 = 1.60729$ | $\nu_2 = 49.19$ |
| $r_3 = -614.9359$ | | | |
| | $d_3 = 0.1348$ | | |
| $r_4 = 31.7354$ | | | |
| | $d_4 = 4.6994$ | $n_3 = 1.70154$ | $\nu_3 = 41.24$ |
| $r_5 = 230.7893$ | | | |
| | $d_5 = D_1$ (variable) | | |

-continued

Embodiment 5

$r_6 = -17.5438$
 $d_6 = 0.9000$   $n_4 = 1.88300$   $\nu_4 = 40.78$
$r_7 = 11.2089$ (aspherical surface)
 $d_7 = 3.5940$
$r_8 = -35.3635$
 $d_8 = 2.5000$   $n_5 = 1.84666$   $\nu_5 = 23.78$
$r_9 = -12.9900$
 $d_9 = D_2$ (variable)
$r_{10} = \infty$ (stop)
 $d_{10} = D_3$ (variable)
$r_{11} = -15.3941$ (aspherical surface)
 $d_{11} = 0.7000$   $n_6 = 1.84666$   $\nu_{,6} = 23.78$
$r_{12} = -63.4565$
 $d_{12} = 0.5694$
$r_{13} = 15.6213$
 $d_{13} = 5.6000$   $n_7 = 1.60311$   $\nu_7 = 60.70$
$r_{14} = -11.8455$ (aspherical surface)
 $d_{14} = D_4$ (variable)

| f | 9 | 22 | 54 |
|---|---|---|---|
| $D_1$ | 2.911 | 19.091 | 29.985 |
| $D_2$ | 27.594 | 11.414 | 0.520 |
| $D_3$ | 11.966 | 12.297 | 18.219 |
| $D_4$ | 12.882 | 12.551 | 6.630 | aspherical coefficient
7th surface  $E = -0.20124 \times 10^{-3}$, $F = -0.21154 \times 10^{-5}$
 $G = 0.14744 \times 10^{-7}$
11th surface $E = -0.81624 \times 10^{-4}$, $F = 0.51417 \times 10^{-6}$
 $G = 0.51314 \times 10^{-7}$
14th surface $E = 0.13396 \times 10^{-3}$, $F = 0.25070 \times 10^{-5}$
 $G = -0.76125 \times 10^{-8}$
$|\Delta x \cdot r/k \cdot f_w| = 6.8 \times 10^{-2}$, $|(D'_{12} - D_{12})/D_{12}| = 0.58$
$|f_{II2}/f_{II} \cdot \beta| = 0.21$, $|\Delta x \cdot f_{BB}/h \cdot f_w| = 2.7 \times 10^{-2}$
$HB_I/f_s = -0.18$, $HB_{II}/f_s = -0.60$, $|f_F/f_R| = 1.71$

Embodiment 6

$f = 9-54$, F/2.8

$r_1 = 40.9574$
 $d_1 = 2.0000$   $n_1 = 1.80518$   $\nu_1 = 25.43$
$r_2 = 25.3159$
 $d_2 = 10.5000$  $n_2 = 1.56965$   $\nu_2 = 49.33$
$r_3 = -299.5508$
 $d_3 = D_1$ (variable)
$r_4 = -58.2636$
 $d_4 = 1.0000$   $n_3 = 1.88300$   $\nu_3 = 40.78$
$r_5 = 11.9010$ (aspherical surface)
 $d_5 = 2.4997$
$r_6 = 21.5836$
 $d_6 = 2.9996$   $n_4 = 1.84666$   $\nu_4 = 23.78$
$r_7 = 160.2411$
 $d_7 = D_2$ (variable)
$r_8 = \infty$ (stop)
 $d_8 = D_3$ (variable)
$r_9 = 8.3005$
 $d_9 = 7.0603$   $n_5 = 1.74950$   $\nu_5 = 35.27$
$r_{10} = -29.8276$
 $d_{10} = 0.9885$
$r_{11} = -9.2429$
 $d_{11} = 0.6000$  $n_6 = 1.84666$   $\nu_6 = 23.78$
$r_{12} = 6.4901$ (aspherical surface)
 $d_{12} = 2.1375$
$r_{13} = 11.3449$
 $d_{13} = 4.5875$  $n_7 = 1.60311$   $\nu_7 = 60.70$
$r_{14} = -9.1940$ (aspherical surface)
 $d_{14} = D_4$ (variable)

| f | 9 | 22 | 54 |
|---|---|---|---|
| $D_1$ | 2.455 | 23.574 | 44.047 |
| $D_2$ | 44.393 | 19.135 | 0.859 |
| $D_3$ | 3.785 | 1.288 | 2.669 |
| $D_4$ | 2.584 | 5.081 | 3.700 | aspherical coefficient
5th surface  $E = -0.73805 \times 10^{-4}$, $F = -0.25972 \times 10^{-6}$
 $G = -0.28896 \times 10^{-8}$
12th surface $E = 0.69054 \times 10^{-4}$, $F = -0.18640 \times 10^{-4}$
 $G = -0.66155 \times 10^{-6}$ -continued

Embodiment 6

14th surface  $E = 0.13577 \times 10^{-3}$, $F = 0.34653 \times 10^{-5}$
 $G = 0.10039 \times 10^{-6}$
$|\Delta x \cdot r/k \cdot f_w| = 8.5 \times 10^{-2}$, $|(D'_{12} - D_{12})/D_{12}| = 0.37$
$|f_{II2}/f_{II} \cdot \beta| = 0.24$, $|\Delta \cdot f_{BB}/h \cdot f_w| = 3.7 \times 10^{-3}$
$HB_I/f_s = -0.34$, $HB_{II}/f_s = -0.28$, $|f_F/f_R| = 1.63$

Embodiment 7

$f = 9-45$, F/2.8

$r_1 = 38.1285$
 $d_1 = 1.9963$   $n_1 = 1.80518$   $\nu_1 = 25.43$
$r_2 = 23.8895$
 $d_2 = 1.2050$
$r_3 = 24.8925$
 $d_3 = 8.4931$   $n_2 = 1.60729$   $\nu_2 = 49.19$
$r_4 = -245.3084$
 $d_4 = D_1$ (variable)
$r_5 = -29.3545$
 $d_5 = 0.9996$   $n_3 = 1.88300$   $\nu_3 = 40.78$
$r_6 = 13.0831$ (aspherical surface)
 $d_6 = 3.9999$
$r_7 = -33.0620$ (aspherical surface)
 $d_7 = 2.5040$   $n_4 = 1.84666$   $\nu_4 = 23.78$
$r_8 = -15.9720$
 $d_8 = D_2$ (variable)
$r_9 = \infty$ (stop)
 $d_9 = D_3$ (variable)
$r_{10} = 25.6429$
 $d_{10} = 1.0005$  $n_5 = 1.84666$   $\nu_5 = 23.78$
$r_{11} = 13.0468$
 $d_{11} = 0.5685$
$r_{12} = 10.4277$
 $d_{12} = 7.9323$  $n_6 = 1.60311$   $\nu_6 = 60.70$
$r_{13} = -23.4265$ (aspherical surface)
 $d_{13} = D_4$ (variable)

| f | 9 | 20.1 | 45 |
|---|---|---|---|
| $D_1$ | 3.000 | 22.395 | 38.333 |
| $D_2$ | 35.597 | 16.201 | 0.264 |
| $D_3$ | 10.009 | 8.583 | 10.251 |
| $D_4$ | 11.006 | 12.432 | 10.764 | aspherical coefficient
6th surface  $E = 0.71072 \times 10^{-4}$, $F = -0.87817 \times 10^{-7}$
 $G = -0.92266 \times 10^{-8}$
7th surface  $E = 0.93807 \times 10hu -4$, $F = 0.33311 \times 10^{-6}$
 $G = 0.10208 \times 10^{-8}$
13th surface $E = 0.13354 \times 10^{-3}$, $F = -0.28718 \times 10^{-6}$
 $G = 0.50394 \times 10^{-7}$
$|\Delta x \cdot r/k \cdot f_w| = 5.7 \times 10^{-2}$, $|(D'_{12} - D_{12})/D_{12}| = 0.07$
$|f_{II2}/f_{II} \cdot \beta| = 0.344$, $|\Delta x \cdot f_{BB}/h \cdot f_w| = 1.6 \times 10^{-2}$
$HB_I/f_s = -0.25$, $HB_{II}/f_s = -0.59$, $|f_F/f_R| = 1.53$

Embodiment 8

$f = 9-54$, F/2.8

$r_1 = 32.7173$
 $d_1 = 2.0000$   $n_1 = 1.80518$   $\nu_1 = 25.43$
$r_2 = 20.8402$
 $d_2 = 8.2852$   $n_2 = 1.60562$   $\nu_2 = 43.72$
$r_3 = 408.8852$
 $d_3 = D_1$ (variable)
$r_4 = -38.9590$
 $d_4 = 0.9992$   $n_3 = 1.88300$   $\nu_3 = 40.78$
$r_5 = 11.8044$ (aspherical surface)
 $d_5 = 4.0000$
$r_6 = -32.6605$ (aspherical surface)
 $d_6 = 2.4980$   $n_4 = 1.84666$   $\nu_4 = 23.78$
$r_7 = -17.3734$
 $d_7 = D_2$ (variable)
$r_8 = \infty$ (stop)
 $d_8 = D_3$ (variable)
$r_9 = 25.3584$
 $d_9 = 1.0008$   $n_5 = 1.84666$   $\nu_5 = 23.78$
$r_{10} = 13.5803$
 $d_{10} = 0.5684$ -continued

Embodiment 8

$r_{11} = 12.3385$ $d_{11} = 7.2817 \quad n_6 = 1.60311 \quad \nu_6 = 60.70$ $r_{12} = -22.1828$ (aspherical surface)

$d_{12} = D_4$ (variable)

| f | 9 | 22 | 54 |
|---|---|---|---|
| $D_1$ | 3.000 | 23.279 | 39.443 |
| $D_2$ | 36.707 | 16.428 | 0.264 |
| $D_3$ | 13.350 | 10.657 | 11.500 |
| $D_4$ | 14.759 | 17.452 | 16.608 | aspherical coefficient

5th surface $\quad E = 0.40890 \times 10^{-4}, F = 0.12640 \times 10^{-5}$
$\quad G = -0.22334 \times 10^{-7}$ 6th surface $\quad E = 0.84542 \times 10^{-4}, F = 0.11221 \times 10^{-5}$
$\quad G = -0.31179 \times 10^{-8}$ 12th surface $\quad E = 0.67994 \times 10^{-4}, F = -0.31420 \times 10^{-6}$
$\quad G = 0.14652 \times 10^{-7}$ $|\Delta x \cdot r/k \cdot f_w| = 1.4 \times 10^{-1}, |(D'_{12} - D_{12})/D_{12}| = 0.21$ $|f_{II2}/f_{II} \cdot \beta| = 0.39, |\Delta x \cdot f_{BB}/h \cdot f_w| = 1.3 \times 10^{-2}$ $HB_I/f_s = -0.35, HB_{II}/f_s = -0.47, |f_F/f_R| = 1.23$

Embodiment 9

$f = 10\text{--}40, F/2.8$ $r_1 = 41.4376$ $d_1 = 2.0000 \quad n_1 = 1.80518 \quad \nu_1 = 25.43$ $r_2 = 24.6480$ $d_2 = 1.9318$ $r_3 = 26.3554$ $d_3 = 9.3025 \quad n_2 = 1.60729 \quad \nu_2 = 49.19$ $r_4 = -139.1914$ $d_4 = D_4$ (variable)

$r_5 = -20.4821$ $d_5 = 0.9998 \quad n_3 = 1.88300 \quad \nu_3 = 40.78$ $r_6 = 17.3498$ (aspherical surface)

$d_6 = 5.0011$ $r_7 = -32.6825$ (aspherical surface)

$d_7 = 2.5008 \quad n_4 = 1.84666 \quad \nu_4 = 23.78$ $r_8 = -15.9197$ $d_8 = D_2$ (variable)

$r_9 = \infty$ (stop)

$d_9 = D_3$ (variable)

$r_{10} = 34.7816$ $d_{10} = 1.0002 \quad n_5 = 1.84666 \quad \nu_5 = 23.78$ $r_{11} = 16.4372$ $d_{11} = 0.5685$ $r_{12} = 11.4422$ $d_{12} = 9.6044 \quad n_6 = 1.60311 \quad \nu_6 = 60.70$ $r_{13} = -32.5904$ (aspherical surface)

$d_{13} = D_4$ (variable)

| f | 10 | 20 | 40 |
|---|---|---|---|
| $D_1$ | 3.250 | 21.685 | 36.268 |
| $D_2$ | 40.502 | 22.068 | 7.485 |
| $D_3$ | 14.441 | 13.446 | 14.810 |
| $D_4$ | 14.480 | 15.475 | 14.111 | aspherical coefficient

6th surface $\quad E = -0.10930 \times 10^{-3}, F = 0.99836 \times 10^{-6}$
$\quad G = -0.11537 \times 10^{-7}$ 7th surface $\quad E = -0.14236 \times 10^{-4}, F = 0.59404 \times 10^{-6}$
$\quad G = -0.56849 \times 10^{-8}$ 13th surface $\quad E = 0.11895 \times 10^{-3}, F = -0.14005 \times 10^{-6}$
$\quad G = 0.30680 \times 10^{-7}$ $|\Delta x \cdot r/k \cdot f_w| = 4.3 \times 10^{-2}, |(D'_{12} - D_{12})/D_{12}| = 0.29$ $|f_{II2}/f_{II} \cdot \beta| = 0.38, |\Delta x \cdot f_{BB}/h \cdot f_w| = 2.4 \times 10^{-2}$ $HB_I/f_s = -0.20, HB_{II}/f_s = -0.76, |f_F/f_R| = 1.48$ When the direction along the optical axis is taken as the x axis and the direction perpendicular to the optical axis is taken as the y axis, the shapes of the aspherical surfaces used in the above-described Embodiments are expressed by the following formula:

$$y = \frac{x^2/r}{1 + \sqrt{1 - (x/r)^2}} + Ex^4 + Fx^6 + Gx^8 + \ldots$$

wherein the reference symbol r represents radius of curvature at the vertex of the aspherical surface, and the reference symbols E, F, G,... designate the coefficients of aspherical surface. Values of the coefficients of aspherical surface adopted for each of the Embodiments are listed in the numerical data.

The Embodiment 1 has the composition illustrated in FIG. 1 wherein the front lens group comprises, in the order from the object side, a first lens unit I comprising a cemented doublet consisting of a negative meniscus lens element having a concave surface on the image side and a biconvex lens element, and a positive meniscus lens component having a convex surface on the object side, and a second lens unit II comprising a biconcave lens component having an aspherical surface adopted mainly for correcting distortion and a positive meniscus lens component having a convex surface on the image side, whereas the rear lens group III comprises, in the order from the object side, a biconvex lens component, a biconcave lens component and a biconvex lens component having an aspherical surface on the image side. In the Embodiment 1, the deviation of the image point caused due to variation of focal length is corrected by shifting the third lens unit III.

Figure 10:
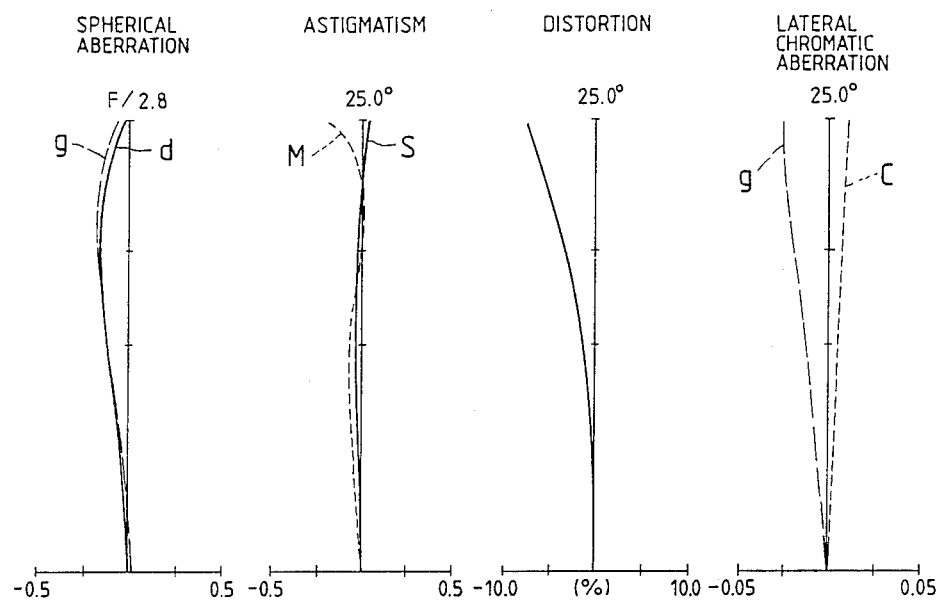
FIG. 10 through FIG. 12 show curves illustrating aberration characteristics of the Embodiment 1 of the present invention.
Figure 11:
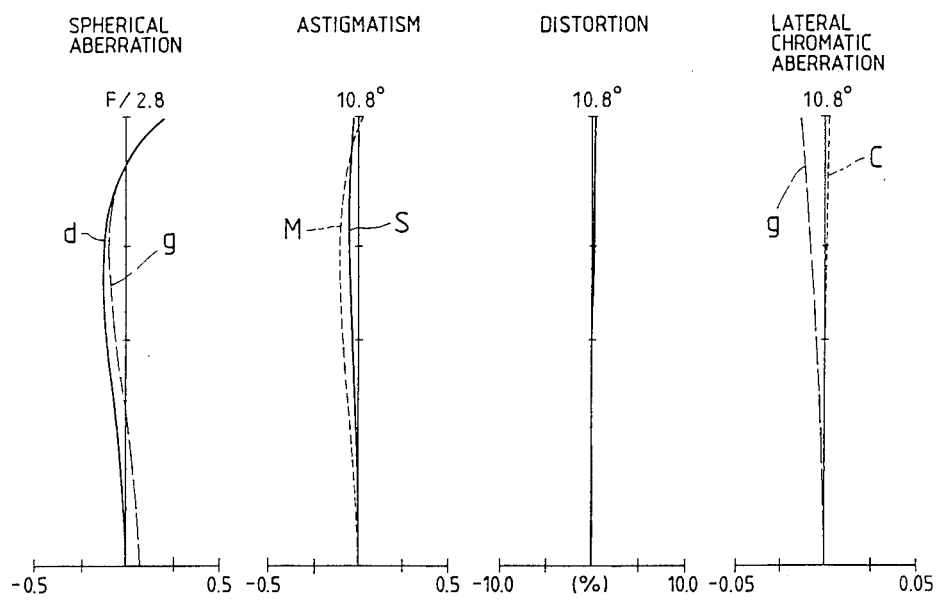
Figure 12:
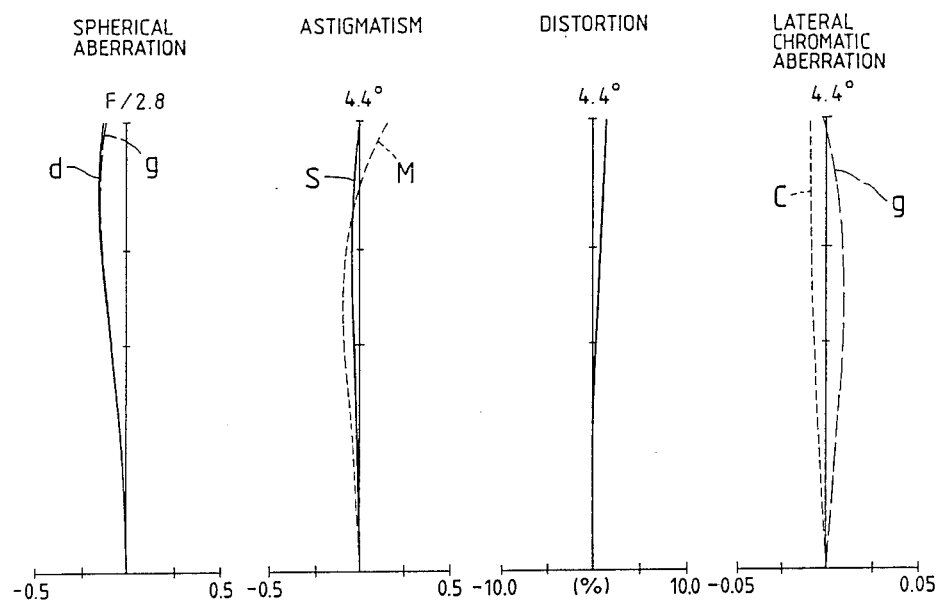

Aberration characteristics at the wide position, intermediate focal length and tele position of the Embodiment 1 for an object located at infinite distance are illustrated in FIG. 10, FIG. 11 and FIG. 12 respectively.

Figure 2:
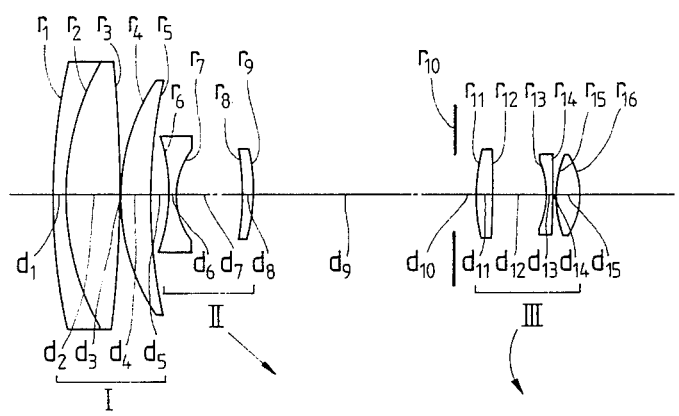

The Embodiment 2 has the composition illustrated in FIG. 2 wherein the front lens group has the same composition as that in the Embodiment 1, and the rear lens group comprises a third lens unit III consisting, in the order from the object side, a biconvex lens component, a negative meniscus lens component having an aspherical concave surface on the object side and a biconvex lens component having an aspherical surface on the image side. The Embodiment 2 is so designed as to correct distortion mainly by the image side aspherical surface of the negative lens component arranged in the second lens unit II and the deviation of the image point caused due to variation of focal length by shifting the third lens unit III.

Figure 13:
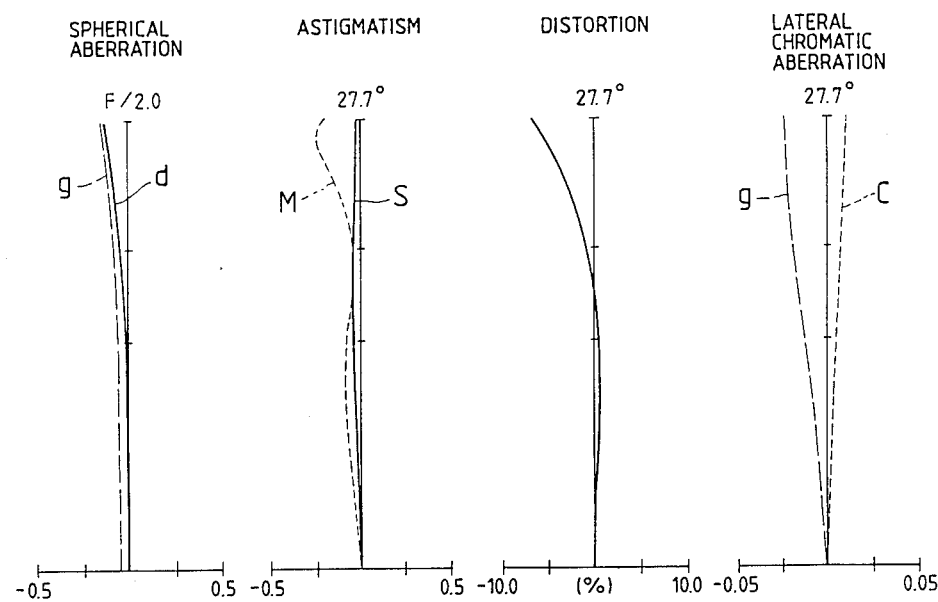
FIG. 13 through FIG. 15 show curves illustrating aberration characteristics of the Embodiment 2 of the present invention.
Figure 14:
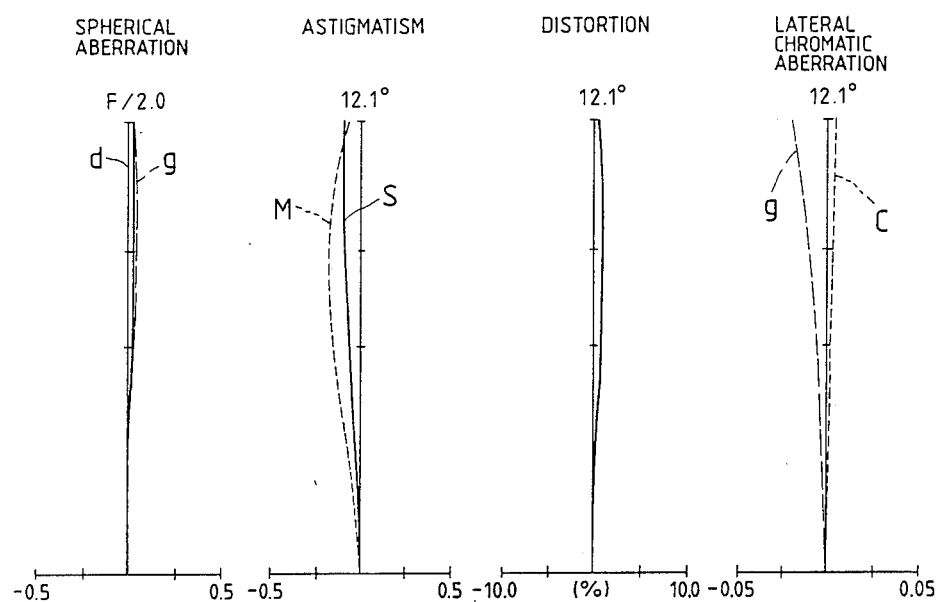
Figure 15:
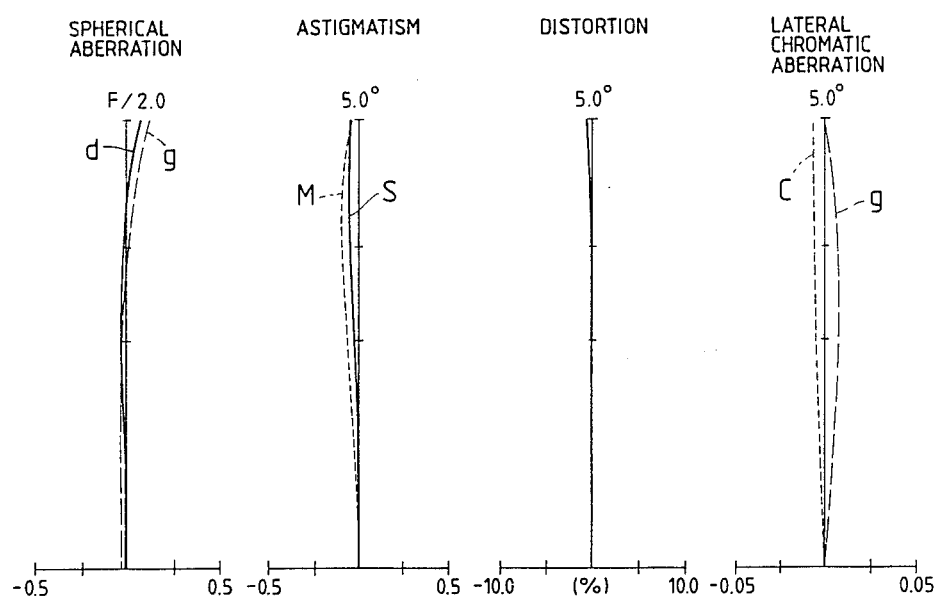

Aberration characteristics at the wide position, intermediate focal length and tele position of the Embodiment 2 for an object located at infinite distance are illustrated in FIG. 13, FIG. 14 and FIG. 15 respectively.

Figure 3:
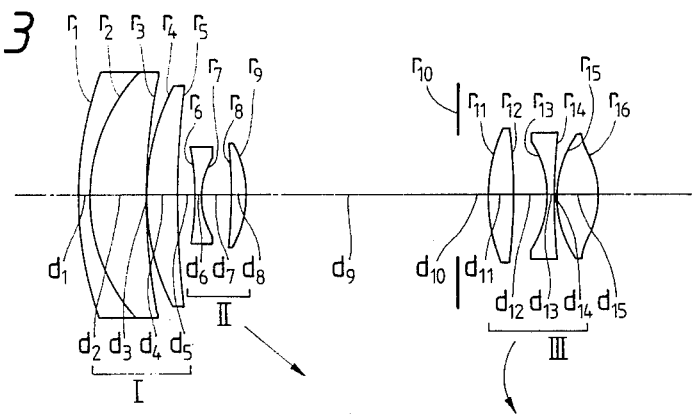

The Embodiment 3 has the composition illustrated in FIG. 3 wherein the front lens group comprises, in the order from the object side, a first lens unit I comprising a cemented doublet consisting of a negative meniscus lens element having a concave surface on the image side and a positive meniscus lens element having a convex surface on the object side, and a positive meniscus lens component having a convex surface on the object side, a second lens unit II comprising a biconcave lens component having an aspherical surface on the image side adopted mainly for correcting distortion and a positive meniscus lens component having an aspherical surface on the object side and a convex surface on the image side, whereas the rear lens group comprises a third lens unit III consisting of a biconvex lens component, a biconcave lens component having an aspherical surface on the image side and a biconvex lens component having an aspherical surface on the image side. The Embodiment 3 is so designed as to correct the deviation of the image point caused due to variation of focal length by shifting the third lens unit III.

Figure 16:
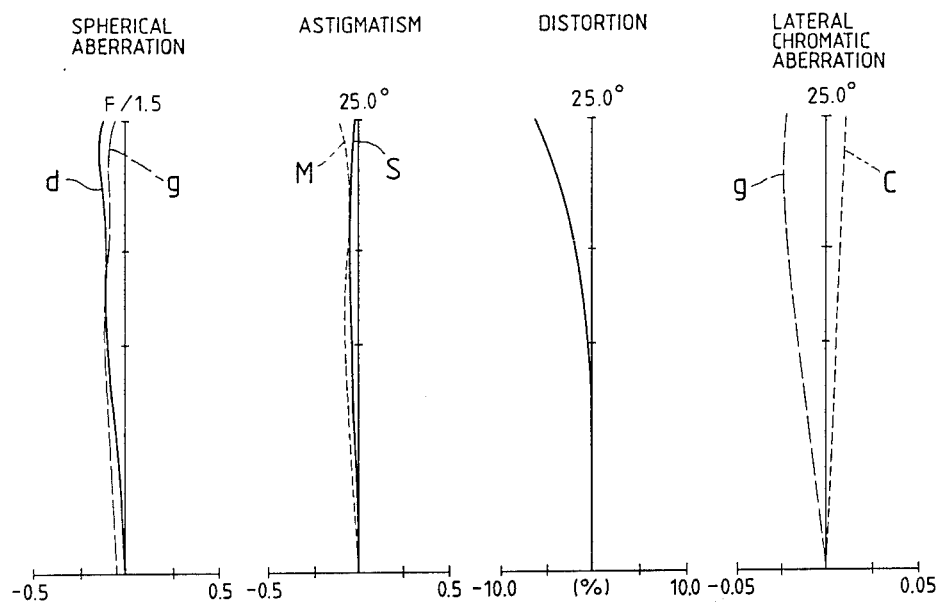
FIG. 16 through FIG. 18 show graphs illustrating aberration characteristics of the Embodiment 3 of the present invention.
Figure 17:
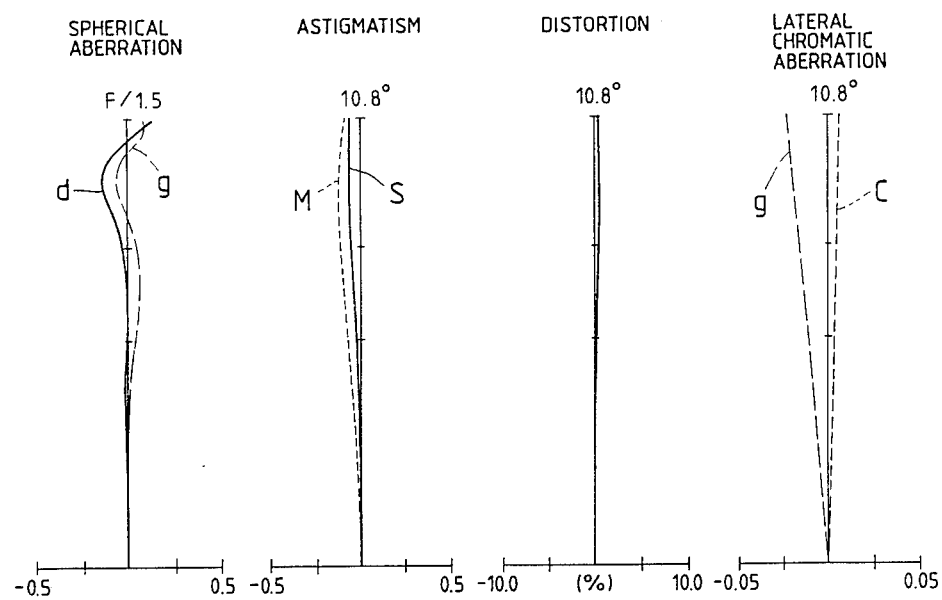
Figure 18:
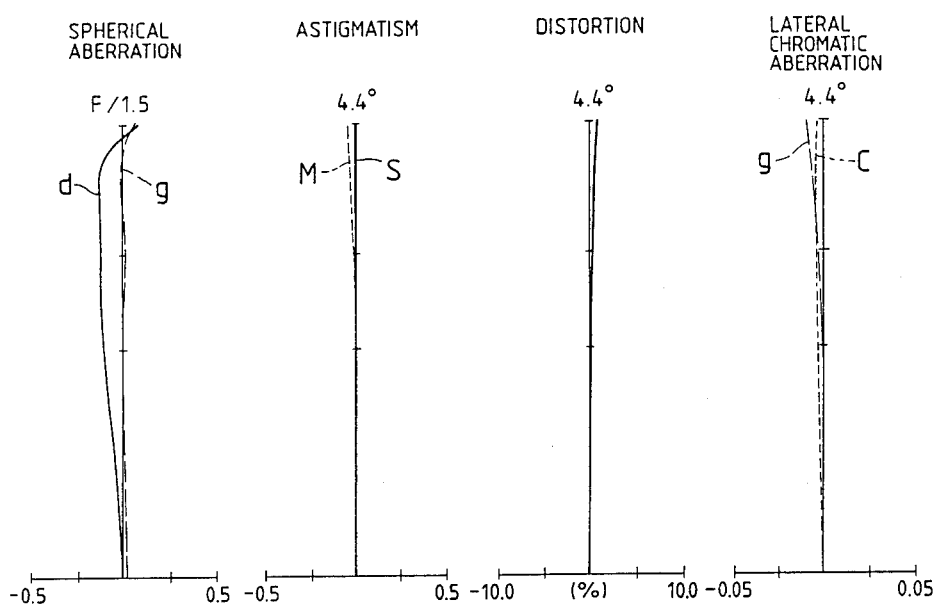

Aberration characteristics at the wide position, intermediate focal length and tele position of the Embodiment 3 for an object located at infinite distance are visualized in FIG. 16, FIG. 17 and FIG. 18 respectively.

Figure 4:
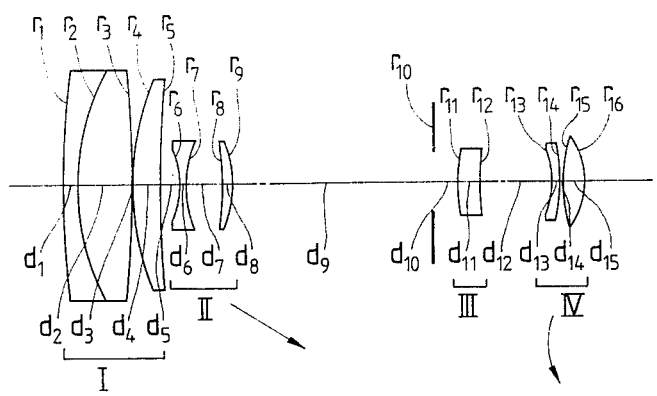
Figure 5:
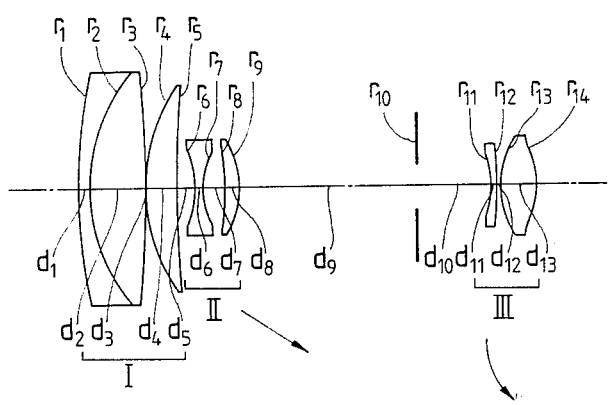

The Embodiment 4 has the composition shown in FIG. 4 wherein the front lens group comprises a first lens unit I having the composition similar to that in the Embodiment 1 and a second lens unit II consisting of a biconcave lens component having an aspherical surface on the object side adopted mainly for correcting the distortion and a positive meniscus lens component having a convex surface on the image side, whereas the rear lens group comprises a third lens unit III consisting of a positive lens component having a convex surface on the object side and a fourth lens unit IV consisting of a negative meniscus lens component having a concave surface on the object side and a biconvex lens component having an aspherical surface on the image side. In this embodiment, the third lens unit is kept fixed during variation of focal length and the fourth lens unit IV is shifted for correcting the deviation of the image point.

Figure 19:
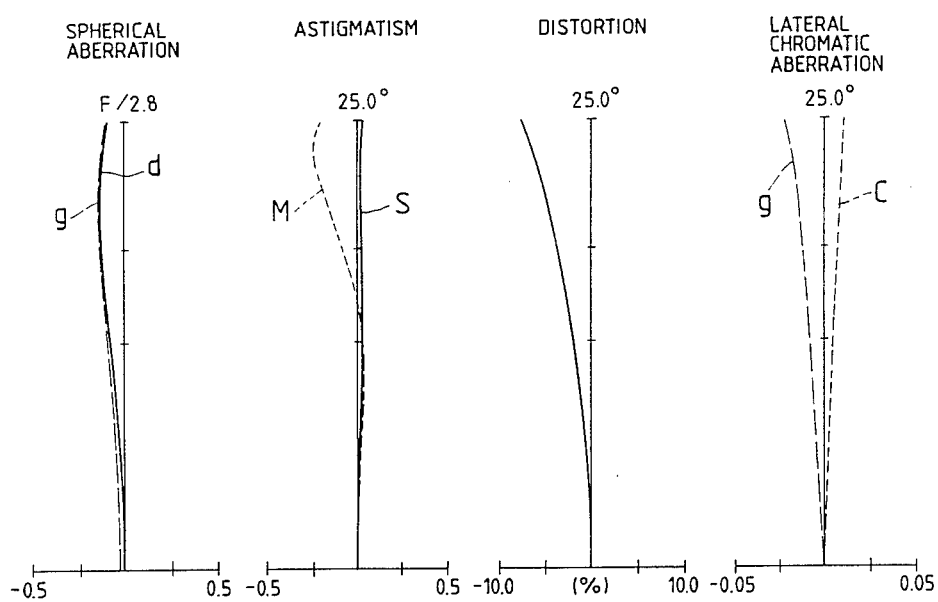
FIG. 19 through FIG. 21 show graphs illustrating aberration characteristics of the Embodiment 4 of the present invention.
Figure 20:
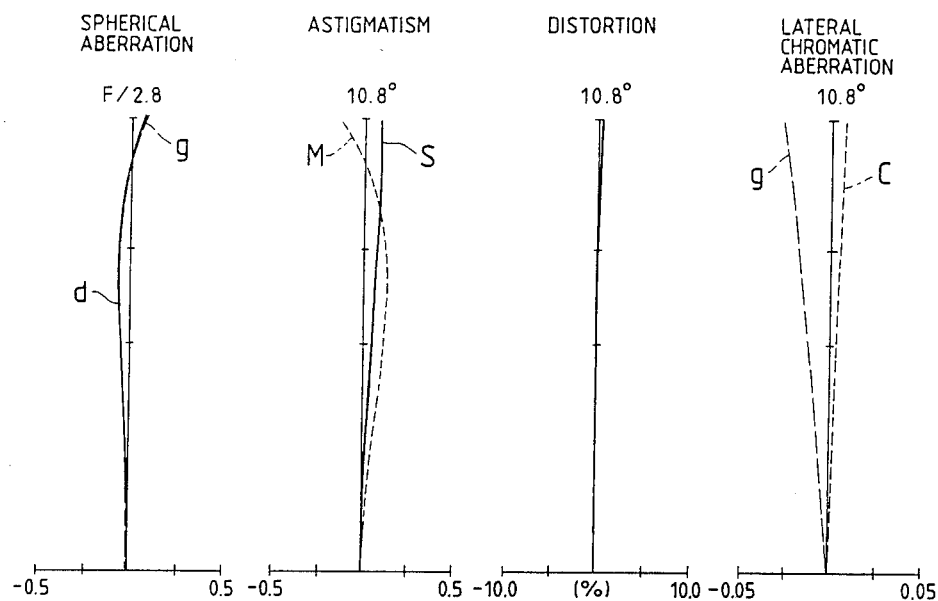
Figure 21:
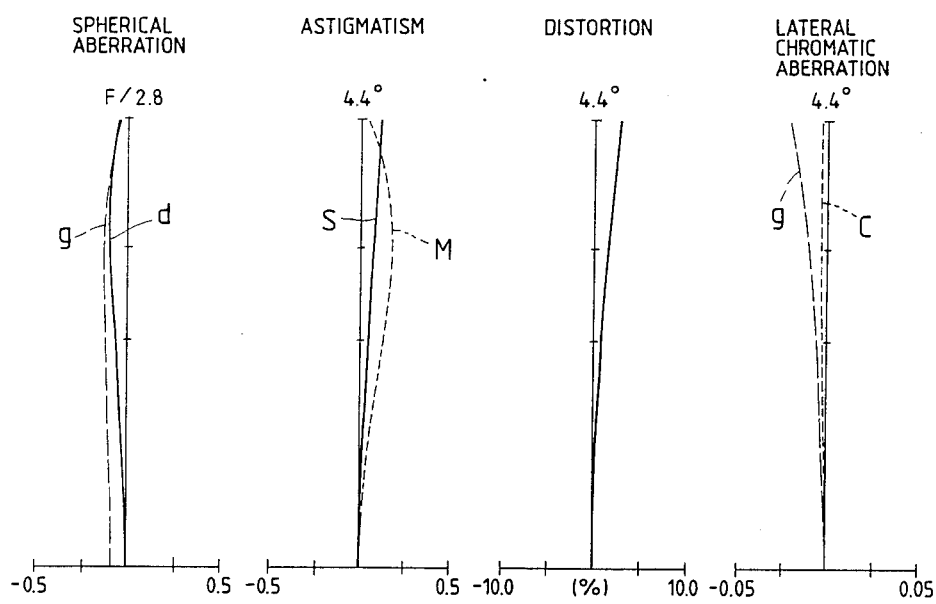

Aberration characteristics at the wide position, intermediate focal length and tele position of the Embodiment 4 for an object located at infinite distance are visualized in FIG. 19, FIG. 20 and FIG. 21 respectively.

The Embodiment 5 has the composition similar to that of the Embodiment 1. The rear lens group comprises a third lens unit III consisting, in the order from the object side, a negative meniscus lens component having an aspherical concave surface on the object side and a biconvex lens component having an aspherical surface on the image side. The aspherical surface arranged as the image side surface of the second lens unit II functions mainly for correcting distortion. Further, the deviation of the image point caused due to variation of focal length is corrected by shifting the third lens unit III.

Figure 22:
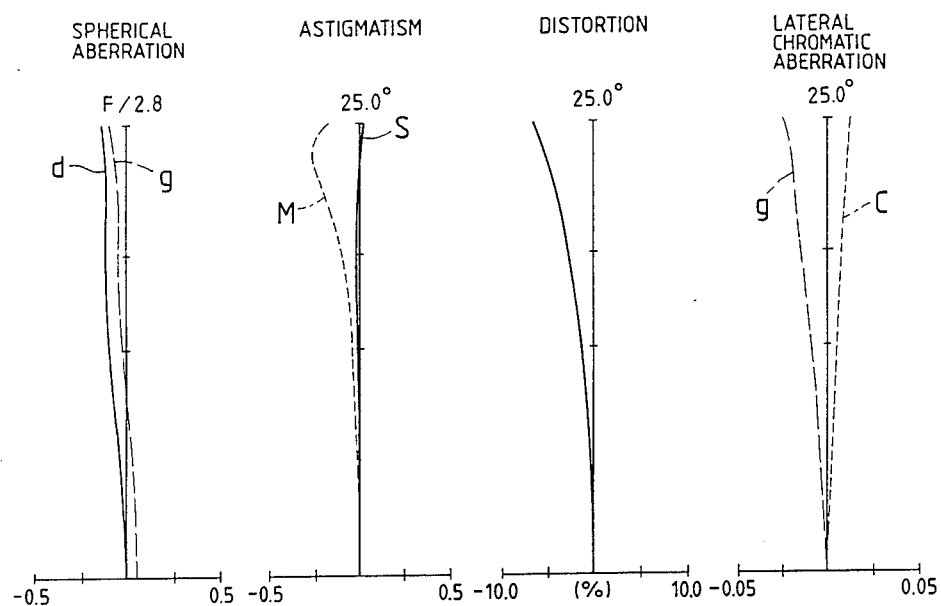
FIG. 22 through FIG. 24 show curves visualizing aberration characteristics of the Embodiment 5 of the present invention.
Figure 23:
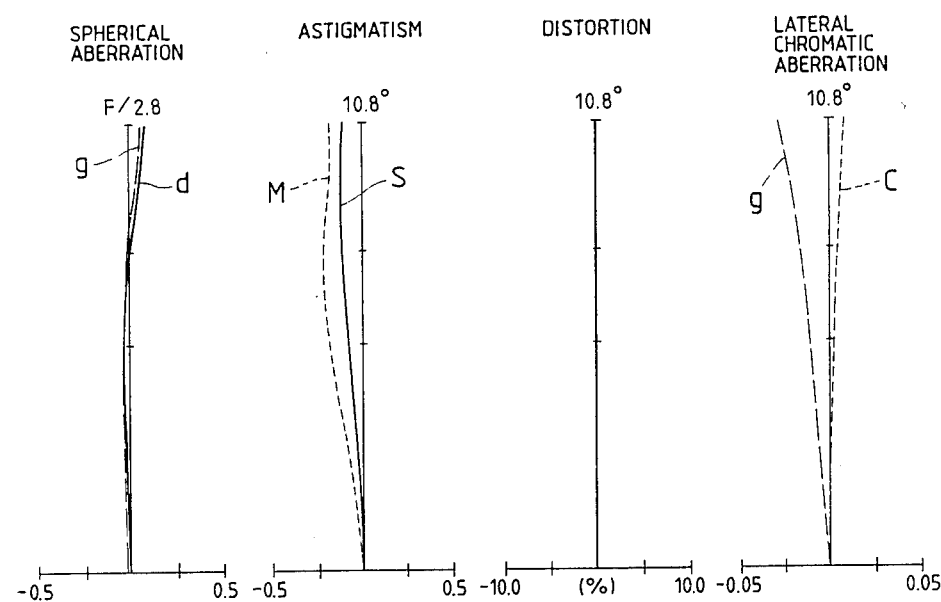
Figure 24:
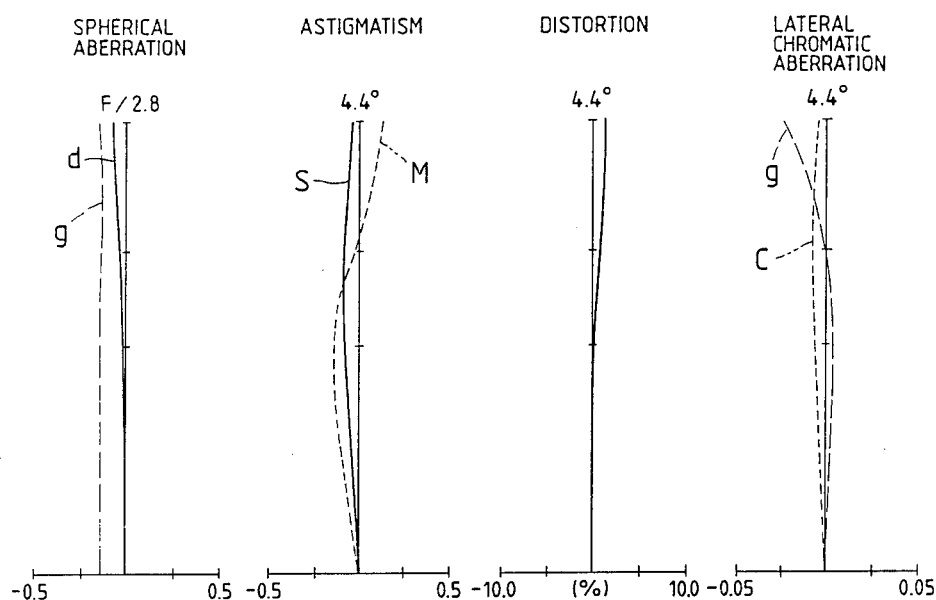

Aberration characteristics at the wide position, intermediate focal length and tele position of the Embodiment 5 for an object located at infinite distance are illustrated in FIG. 22, FIG. 23 and FIG. 24 respectively.

Figure 6:
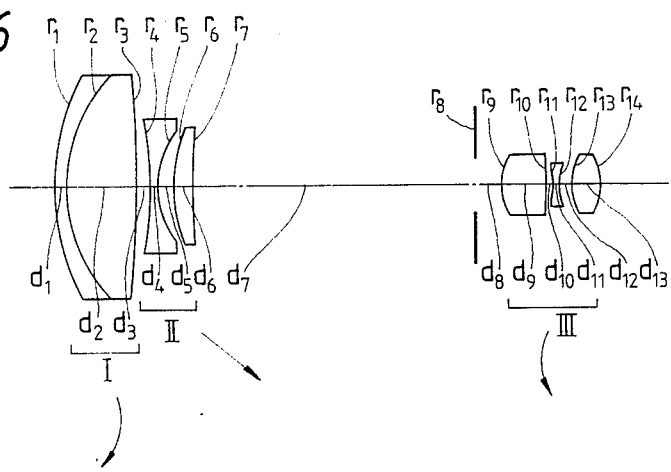

The Embodiment 6 has the composition illustrated in FIG. 6 wherein the front lens group comprises a first lens unit I composed of a cemented doublet consisting of a negative meniscus lens element having a concave surface on the image side and a biconvex lens element, and a second lens unit II consisting of a biconcave lens component having an aspherical surface on the image side adopted mainly for correcting distortion and a positive meniscus lens component having a convex surface on the object side, whereas the rear lens group comprises a third lens unit III consisting of a biconvex lens component, a biconcave lens component having an aspherical surface on the image side and a biconvex lens component having an aspherical surface on the image side. In this embodiment, the third lens unit III is shifted for correcting the deviation of the image point during variation of focal length and the first lens unit I is shifted for correcting variations of aberrations with good balance during variation of focal length.

Figure 25:
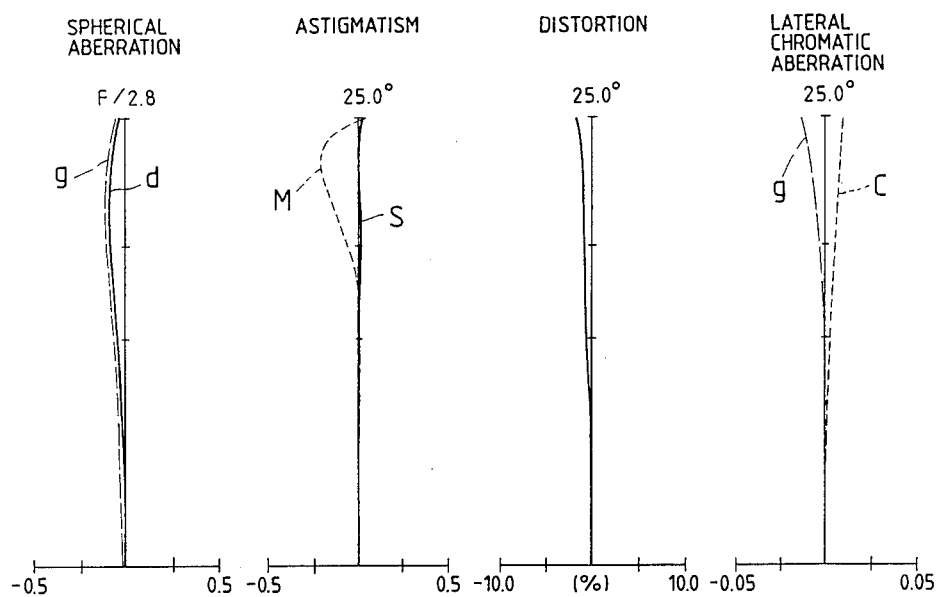
FIG. 25 through FIG. 27 show curves visualizing aberration characteristics of the Embodiment 6 of the present invention.
Figure 26:
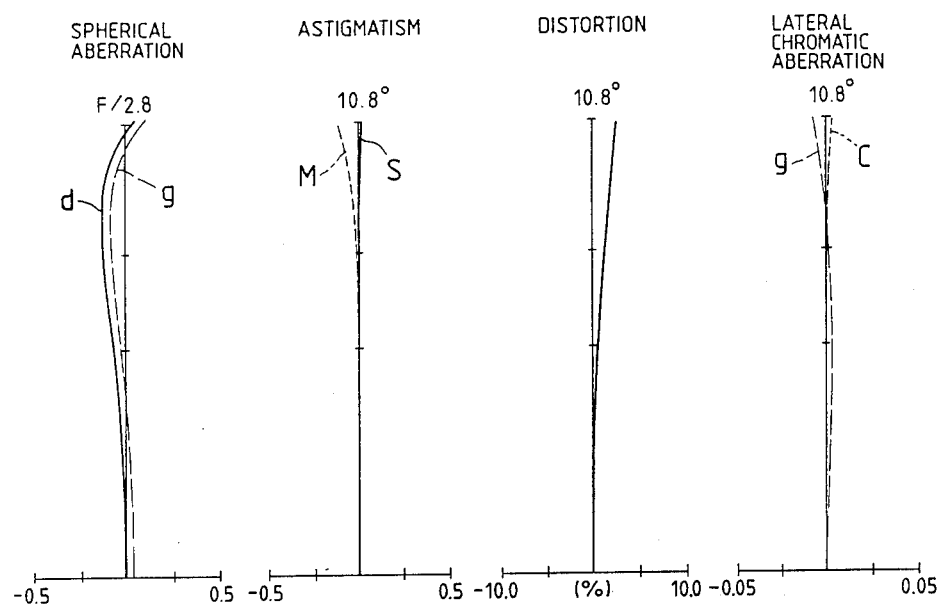
Figure 27:
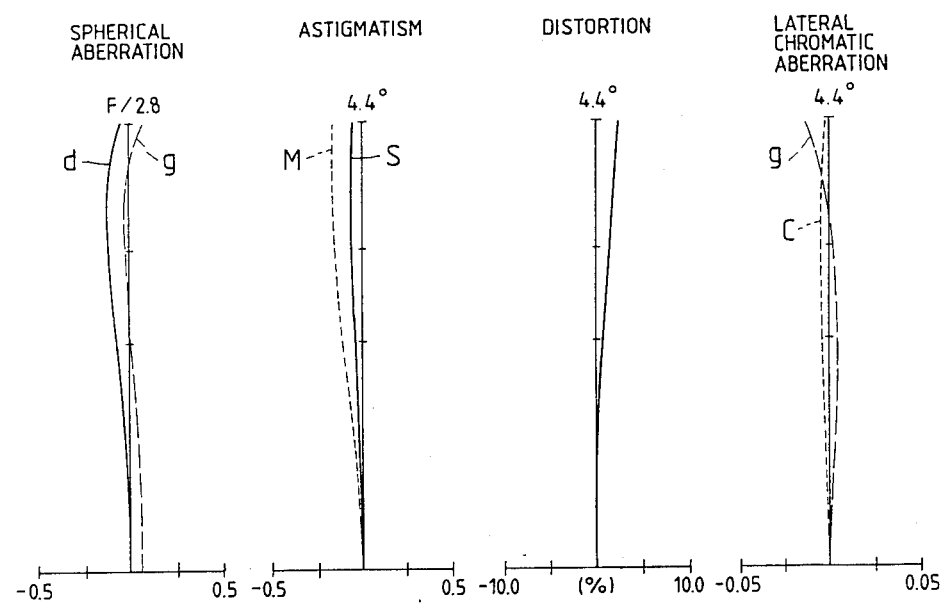

Aberration characteristics at the wide position, intermediate focal length and tele position of the Embodiment 6 for an object located at infinite distance are illustrated in FIG. 25, FIG. 26 and FIG. 27 respectively.

Figure 7:
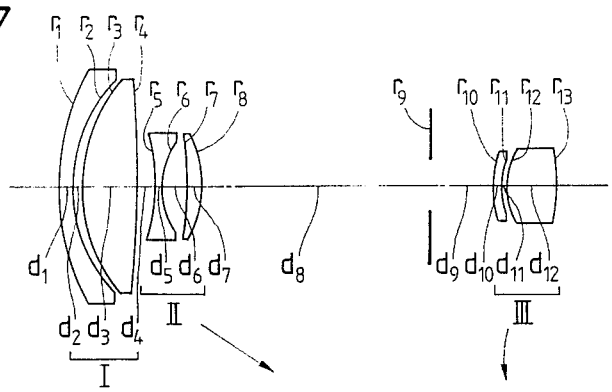

The Embodiment 7 has the composition shown in FIG. 7 wherein the front lens group comprises a first lens unit I consisting of a negative meniscus lens component having a concave surface on the image side and a biconvex lens component, and a second lens unit II consisting of a biconcave lens component having an aspherical surface on the image side and a positive meniscus lens component having an aspherical surface on the object side adopted mainly for correcting distortion, whereas the rear lens group comprises a third lens unit III consisting of a negative meniscus lens component having a concave surface on the image side and a biconvex lens component having an aspherical surface on the image side. Also in this embodiment, the third lens unit III is shifted for correcting the deviation of the image point during variation of focal length.

Figure 28:
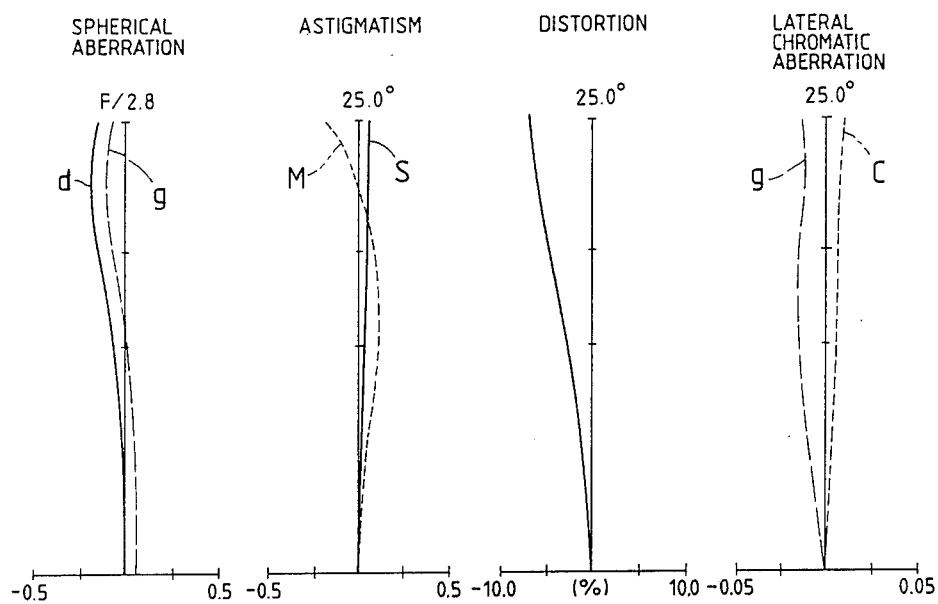
FIG. 28 through FIG. 30 show graphs visualizing aberration characteristics of the Embodiment 7 of the present invention.
Figure 29:
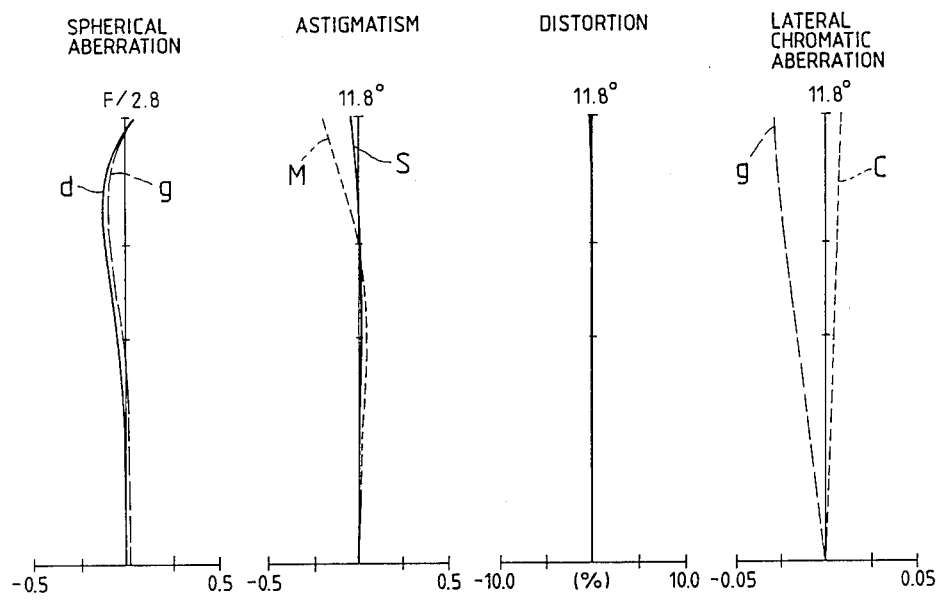
Figure 30:
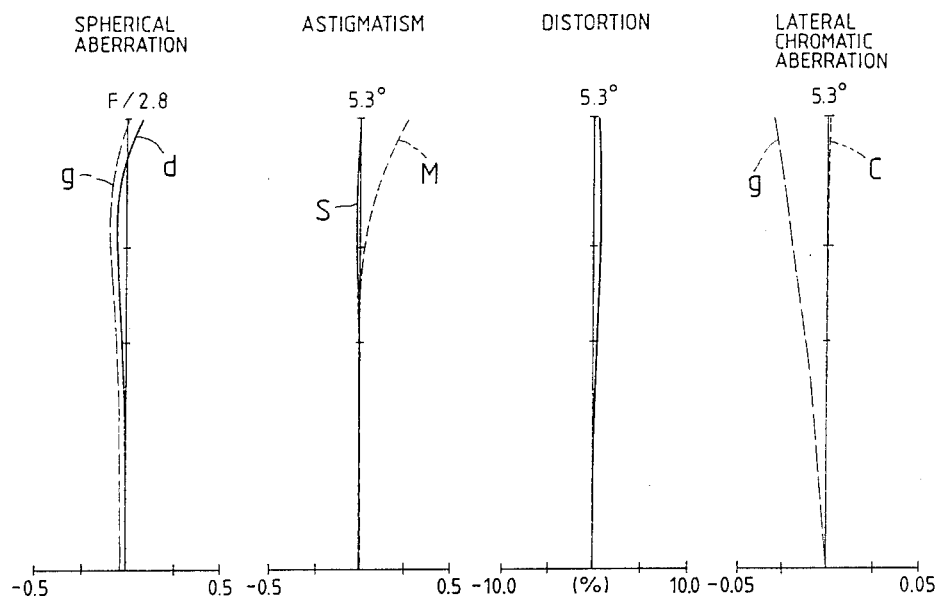

Aberration characteristics at the wide position, intermediate focal length and tele position of the Embodiment 7 for an object located at infinite distance are visualized in FIG. 28, FIG. 29 and FIG. 30 respectively.

Figure 8:
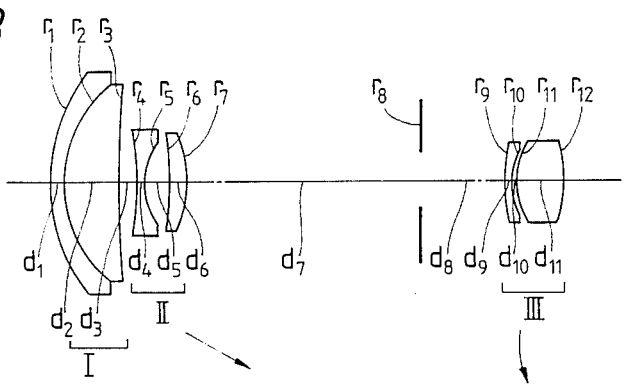

The Embodiment 8 has the composition shown in FIG. 8 wherein the first lens unit I of the front lens group comprises a cemented doublet consisting of a negative meniscus lens element having a concave surface on the image side and a positive meniscus lens element having a convex surface on the object side, whereas the second lens unit II of the front lens group and the third lens unit III of the rear lens group have the same compositions as those in the Embodiment 7. In this embodiment, the object side surface of the second lens unit II is designed as an aspherical surface for correcting the distortion mainly. Further, the deviation of the image point caused due to variation of focal length is corrected by shifting the third lens unit III.

Figure 31:
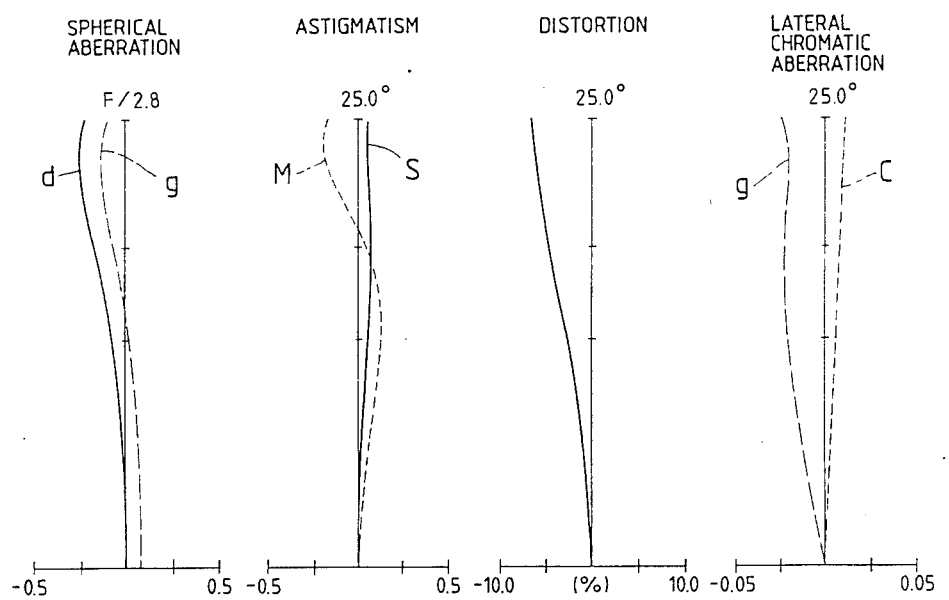
FIG. 31 through FIG. 33 show curves illustrating aberration characteristics of the Embodiment 8 of the present invention.
Figure 32:
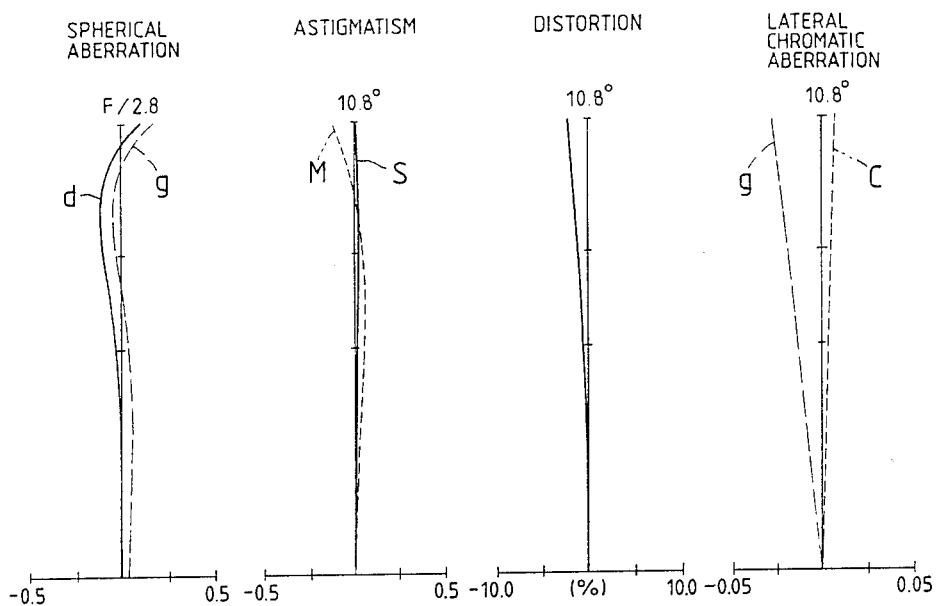
Figure 33:
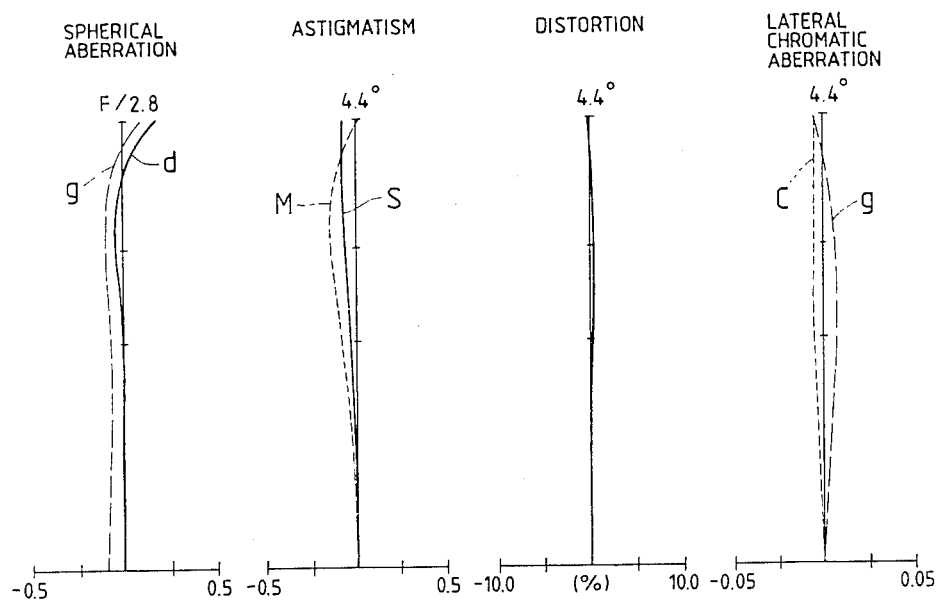

Aberration characteristics at the wide position, intermediate focal length and tele position of the Embodiment 8 for an object located at infinite distance are illustrated in FIG. 31, FIG. 32 and FIG. 33 respectively.

Figure 9:
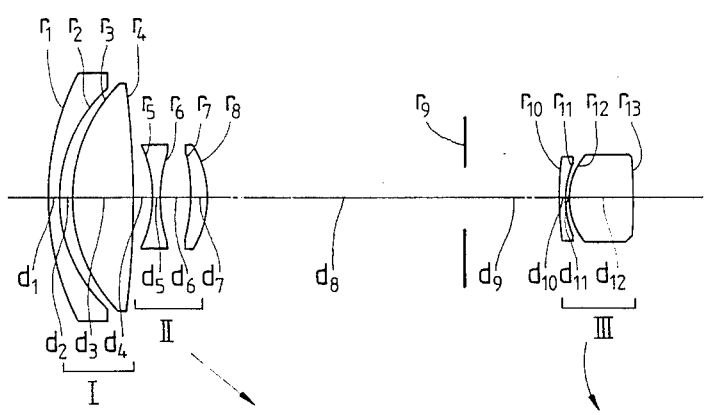

The Embodiment 9 has the composition similar to that of the Embodiment 7 as shown in FIG. 9 wherein the image side surface of the negative lens component arranged in the second lens unit II is designed as an aspherical surface for correcting the distortion mainly. Further, the deviation of the image point caused due to variation of focal length is corrected by shifting the third lens unit III.

Figure 34:
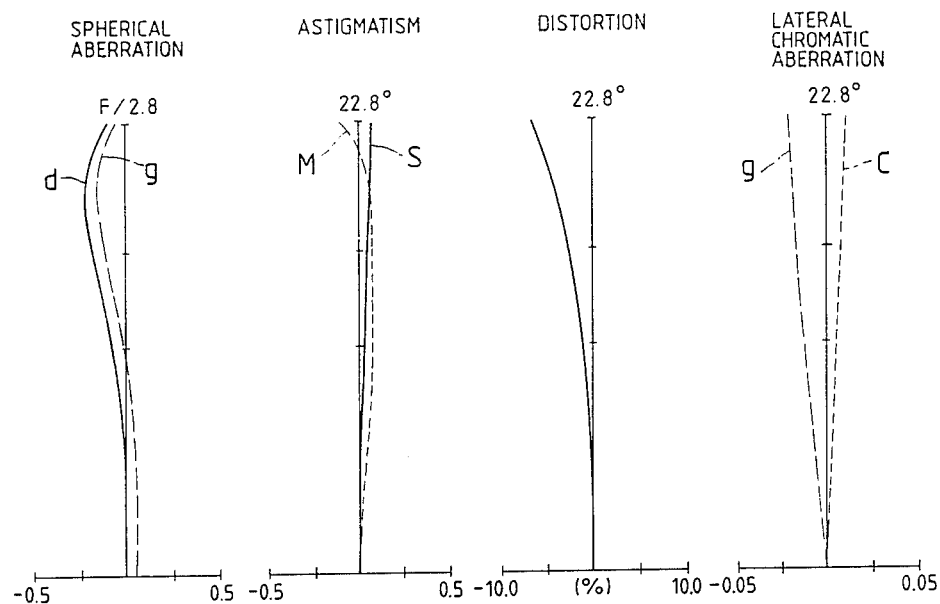
FIG. 34 through FIG. 36 show curves illustrating aberration characteristics of the Embodiment 9 of the present invention.
Figure 35:
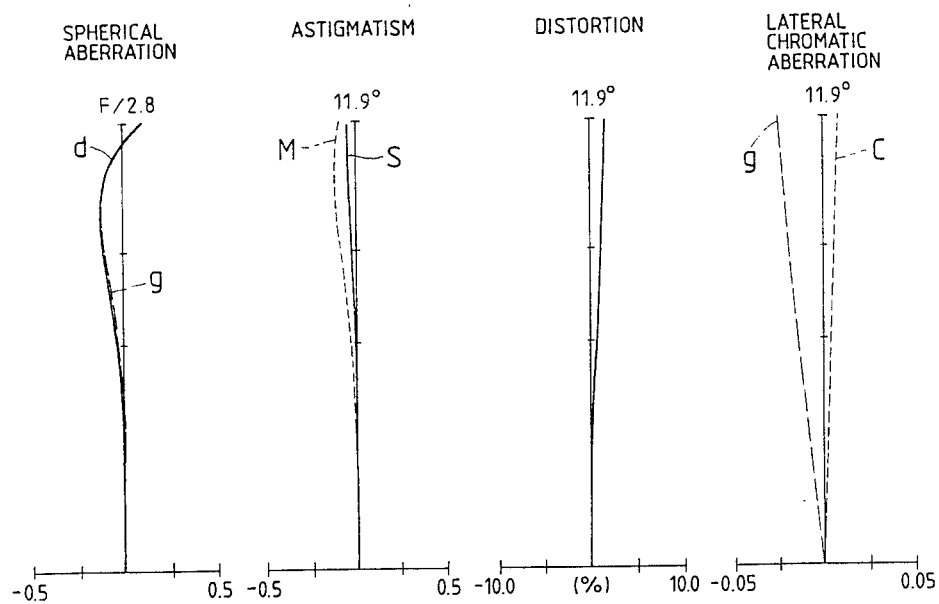
Figure 36:
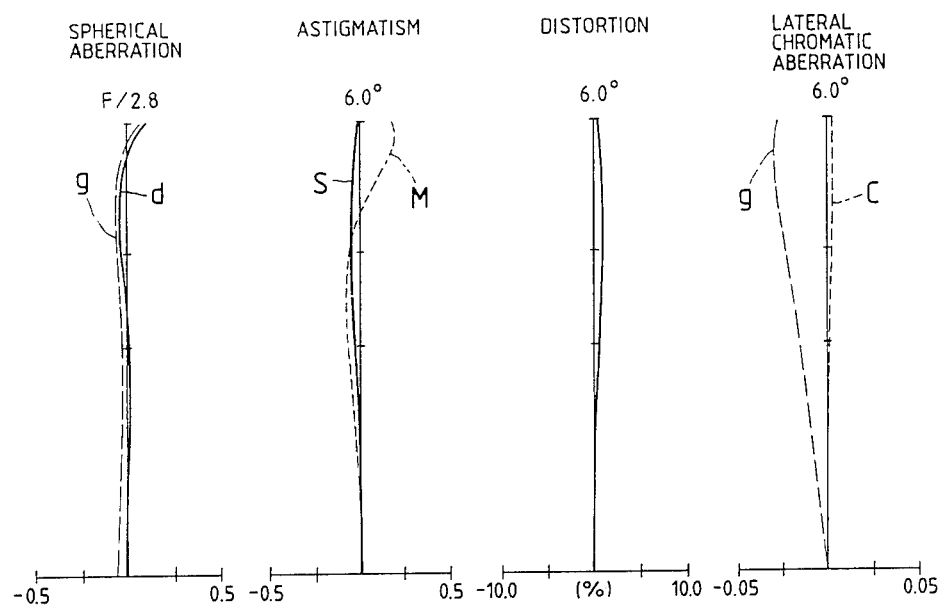

Aberration characteristics at the wide position, intermediate focal length and tele position of the Embodiment 9 for an object located at infinite distance are illustrated in FIG. 34, FIG. 35 and FIG. 36 respectively. In addition, the arrow shown in each of FIGS. 1 through 9 qualitatively indicates the shift of each lens unit and the lens units illustrated with no arrow are kept fixed during variation of focal length.

Taking into consideration the members for splitting an optical path to a viewfinder, optical filter, etc. which are to be arranged in practice, the aberration characteristics of each of the Embodiments are illustrated in the form of graphs of the lens systems which comprise, between the final lens surface and the image plane, a plane parallel plate having thickness d, a refractive index n and an Abbe's number $\nu$ of the values listed below:

$$d = 18.5000 \quad n = 1.51633 \quad \nu = 64.15$$

In the numerical data of the Embodiments described above, the reference symbol $D_4$ represents distance between the final lens surface and said plane parallel plate. The vari-focal lens system according to the present invention is a lens system which is compact, light in weight, manufacturable at low cost, designed for a vari-focal ratio of 4 to 6 and an F number on the order of F/1.5 to F/2.8, and is so adapted as to comprise a very small number of lens components, concretely six to eight lens components in total, by composing the second lens unit of the front lens group of two lens components and the rear lens group of two or three lens components.

I claim:

1. A vari-focal lens system comprising, in the order from the object side, a front lens group having negative refractive power and a rear lens group having positive refractive power, said front lens group consisting, in the order from the object side, of a first lens unit having positive refractive power, and a second lens unit having negative refractive power and shifted along the optical axis for varying focal length, said rear lens group having an imaging function and being at least partially shiftable during variation of focal length for correcting deviation of the image point caused due to variation of focal length, said second lens unit consisting, in the order from the object side, of a negative lens component and a positive lens component, and at least one of diverging surfaces arranged in the second lens unit being designed as an aspherical surface.

2. A varifocal lens system according to claim 1 wherein said negative lens component and positive lens component of said second lens unit are composed of a single negative lens and a single positive lens respectively, and said vari-focal lens system satisfying the following condition (3):

$$|(D'_{12}-D_{12})/D_{12}| < 0.8$$
$$D_{12}=(\nu_{II1}f_{II1}+\nu_{II2}f_{II2})/(\nu_{II2}+\nu_{II1}) \quad (3)$$

wherein the reference symbols $f_{II1}$ and $f_{II2}$ represent focal lengths of the negative lens component and the positive lens component respectively arranged in the second lens unit, the reference symbols $\nu_{II1}$ and $\nu_{II2}$ designate Abbe's number of said negative lens component and the positive lens component respectively, and the reference symbol $D'_{12}$ denotes distance as measured from the rear principal point of the negative lens component to the front principal point of the positive lens component.

3. A vari-focal lens system according to claim 1 wherein said aspherical surface satisfies the following condition (1):

$$5\times10^{-3} < |\Delta x \cdot r/k \cdot f_w| < 5\times10^{-1} \quad (1)$$

wherein the reference symbol r represents radius of curvature on the basic spherical surface of said aspherical surface, the reference symbol k designates distance as measured from the optical axis to the intersection between the principal ray to attain to the maximum image height and said aspherical surface, the reference symbol $\Delta x$ represents deviation of said intersection on the aspherical surface from the basic spherical surface thereof, and the reference symbol $f_w$ denotes focal length of the vari-focal lens system as a whole at wide position.

4. A varifocal lens system according to claim 3 wherein said negative lens component and positive lens component of said second lens unit are composed of a single negative lens and a single positive lens respectively, and said vari-focal lens system satisfying the following condition (3):

$$|(D'_{12}-D_{12})/D_{12}| < 0.8$$
$$D_{12}=(V_{II1}f_{II1}+V_{II2}f_{II2})/(\nu_{II2}+\nu_{II1}) \quad (3)$$

wherein the reference symbols $f_{II1}$ and $f_{II2}$ represent focal lengths of the negative lens component and the positive lens component respectively arranged in the second lens unit, the reference symbols $\nu_{II1}$ and $\nu_{II2}$ designated Abbe's number of said negative lens component and the positive lens component respectively, and the reference symbol $D'_{12}$ denotes distance as measured from the rear principal point of the negative lens component to the front principal point of the positive lens component.

5. A vari-focal lens system according to claim 4 satisfying the following condition (4):

$$0.15 < |\text{fhd } II2/f_{II\beta}| < 3 \quad (4)$$

wherein the reference symbol $f_{II2}$ represents focal length of the positive lens component arranged in the second lens unit, the reference symbol $f_{II}$ designates focal length of the second lens unit as a whole and the reference symbol $\beta$ denotes vari-focal ratio.

6. A vari-focal lens system according to claim 5 wherein said aspherical surface comprised in the rear lens group satisfies the following condition (5):

$$1\times10^{-3} < |\Delta x \cdot f_{BB}/h \cdot f_w| < 5\times10^{-1} \quad (5)$$

wherein the reference symbol h represents distance as measured from the optical axis to the intersection between the paraxial marginal ray and the aspherical surface arranged in the rear lens group, the reference symbol $\Delta x$ designates deviation of said intersection on the aspherical surface from the standard spherical surface thereof, the reference symbol $f_{BB}$ denotes focal length of the lens component arranged on the extreme image side in the rear lens group, and the reference symbol $f_W$ represents focal length of the vari-focal lens system as a whole at the wide position.

7. A vari-focal lens system according to claim 6 satisfying the following conditions (6) and (7):

$$-1.5 < HB_I/f_S < -3\times10^{-2} \quad (6)$$

$$-3.5 < HB_{II}/f_S < -7\times10^{-2} \quad (7)$$

wherein the reference symbol $H_{BI}$ represents distance as measured from the vertex on the image side surface of the lens component arranged on the extremely image side in the first lens unit to the rear principal point of the first lens unit taking the direction toward the image side as positive, the reference symbol $HB_{II}$ designates distance as measured from the vertex on the image side surface of the negative lens component arranged in the second lens unit to the rear principal point of the second lens unit taking the direction toward the image side as positive, and the reference symbol $f_S$ denotes an intermediate focal length of the vari-focal lens system as a whole (defined as $\sqrt{f_W \cdot f_T}$ when focal lengths at the wide position and the tele position are represented by $f_W$ and $f_T$ respectively).

8. A vari-focal lens system according to claim 7 satisfying the following condition (8):

$$0.4 < |f_F/f_R| < 5 \quad (8)$$

wherein the reference symbols $f_F$ and $f_R$ represent focal lengths of the front lens group and the rear lens group respectively.

9. A vari-focal lens system according to claim 1, 3, or wherein said aspherical surface comprised in the rear lens group satisfies the following condition (5):

$$1 \times 10^{-3} < |\Delta x \cdot f_{BB}/h \cdot f_w| < 5 \times 10^{-1} \quad (5)$$

wherein the reference symbol h represents distance as measured from the optical axis to the intersection between the paraxial marginal ray and the aspherical surface arranged in the rear lens group, the reference symbol $\Delta x$ designates deviation of said intersection on the aspherical surface from the standard spherical surface thereof, the reference symbol $f_{BB}$ denotes focal length of the lens component arranged on the extremely image side in the rear lens group, and the reference symbol $f_w$ represents focal length of the vari-focal lens system as a whole at the wide position.

10. A vari-focal lens system according to claim 1, 3, 4 or 5 satisfying the following conditions (6) and (7):

$$-1.5 < HB_I/f_s < -3 \times 10^{-2} \quad (6)$$

$$-3.5 < HB_{II}/f_s < -7 \times 10^{-2} \quad (7)$$

wherein the reference symbol $HB_I$ represents distance as measured from the vertex on the image side surface of the lens component arranged on the extremely image side in the first lens unit to the rear principal point of the first lens unit taking the direction toward the image side as positive, the reference symbol $HB_{II}$ designates distance as measured from the vertex on the image side surface of the negative lens component arranged in the second lens unit to the rear principal point of the second lens unit taking the direction toward the image side as positive, and the reference symbol $f_s$ denotes an intermediate focal length of the vari-focal lens system as a whole (defined as $\sqrt{f_W \cdot f_T}$ when focal lengths at the wide position and the tele position are represented by $f_W$ and $f_T$ respectively).

11. A vari-focal lens system according to claim 1, 3, 4, 5 or 6 satisfying the following condition (8):

$$0.4 < |f_F/f_R| < 5 \quad (8)$$

wherein the reference symbols $f_F$ and $f_R$ represent focal lengths of the front lens group and the rear lens group respectively.

12. A vari-focal lens system according to claim 1 wherein the rear lens group consists of at most three lens components including a negative lens component and a positive lens component, and comprises an aspherical surface as the image side surface of the lens component arranged on the extremely image side.

13. A vari-focal lens system according to claim 8 or 12 wherein said first lens unit comprises, in the order from the object side, a cemented doublet consisting of a negative lens element having a concave surface on the image side and a biconvex lens element, and a positive meniscus lens component having a convex surface on the object side, and said rear lens group comprises, in the order from the object side, a biconvex lens component and a biconvex lens component.

14. A vari-focal lens system according to claim 8 or 12 wherein said first lens unit comprises, in the order from the object side, a cemented doublet consisting of a negative meniscus lens element having a concave surface on the image side and a biconvex lens element, and a positive meniscus lens component having a convex surface on the object side, and said rear lens group comprises, in the order from the object side, a biconvex lens component, a negative meniscus lens component having a concave surface on the object side and a biconvex lens component.

15. A vari-focal lens system according to claim 8 or 12 wherein said first lens unit comprises, in the order from the object side, a cemented doublet consisting of a negative meniscus lens element having a concave surface on the image side and a positive meniscus lens element having a convex surface on the object side, and a positive meniscus lens component having a convex surface on the object side, and said rear lens group comprises, in the order from the object side, a biconvex lens component, a biconcave lens component and a biconvex lens component.

16. A vari-focal lens system according to claim 8 or 12 wherein said first lens unit comprises, in the order from the object side, a cemented doublet consisting of a negative meniscus lens element having a concave surface on the image side and a biconvex lens element, and a positive meniscus lens component having a convex surface on the object side, and said rear lens group comprises a third lens unit consisting of a positive lens component having a convex surface on the object side, and a fourth lens unit consisting of a negative meniscus lens component having a convex surface on the object side and a biconvex lens component.

17. A vari-focal lens system according to claim 8 or 12 wherein said first lens unit comprises, in the order from the object side, a cemented doublet consisting of a negative meniscus lens element having a concave surface on the image side and a biconvex lens element, and a positive meniscus lens component having a convex surface on the object side, and said rear lens group comprises a negative meniscus lens component having a concave surface on the object side and a biconvex lens component.

18. A vari-focal lens system according to claim 8 or 12 wherein said first lens unit consists of a cemented doublet consisting of a negative meniscus lens element having a concave surface on the image side and a biconvex lens element, and said rear lens group comprises, in the order from the object side, a biconvex lens component, a biconcave lens component and a biconvex lens component.

19. A vari-focal lens system according to claim 8 or 12 wherein said first lens unit consists, in the order from the object side, of a negative meniscus lens component having a concave surface on the image side and a biconvex lens component, and said rear lens group comprises a negative meniscus lens component having a concave surface on the image side and a biconvex lens component.

20. A vari-focal lens system according to claim 8 or 12 wherein said first lens unit consists of a cemented doublet consisting of a negative meniscus lens element having a concave surface on the image side and a biconvex lens element, and said rear lens group comprises a negative meniscus lens component having a concave surface on the image side and a biconvex lens component.

* * * * *